United States Patent
Ihashi et al.

(10) Patent No.: US 11,382,153 B2
(45) Date of Patent: Jul. 5, 2022

(54) COMMUNICATION SYSTEM, COMMUNICATION METHOD, ELECTRONIC TIMEPIECE, AND COMMUNICATION APPARATUS

(71) Applicant: Seiko Instruments Inc., Chiba (JP)

(72) Inventors: Tomohiro Ihashi, Chiba (JP); Takayuki Nomura, Chiba (JP); Tamotsu Maesawa, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 711 days.

(21) Appl. No.: 16/298,045

(22) Filed: Mar. 11, 2019

(65) Prior Publication Data
US 2019/0289654 A1    Sep. 19, 2019

(30) Foreign Application Priority Data
Mar. 13, 2018 (JP) .............................. JP2018-045402

(51) Int. Cl.
*G04G 21/04* (2013.01)
*H04W 76/14* (2018.01)

(52) U.S. Cl.
CPC .............. *H04W 76/14* (2018.02); *G04G 21/04* (2013.01)

(58) Field of Classification Search
CPC ....... H04W 76/14; H04W 76/18; H04W 4/07; G04G 21/04; G04R 20/26
See application file for complete search history.

(56) References Cited

U.S. PATENT DOCUMENTS

| | | | |
|---|---|---|---|
| 10,149,142 B2 * | 12/2018 | Coulis | H04W 8/005 |
| 2006/0058926 A1 * | 3/2006 | Abbott | G04G 9/0005 |
| | | | 701/1 |
| 2014/0220885 A1 * | 8/2014 | Chou | H04W 4/80 |
| | | | 455/41.1 |

(Continued)

FOREIGN PATENT DOCUMENTS

| | | |
|---|---|---|
| JP | H05-14488 A | 1/1993 |
| JP | 2011-204246 A | 10/2011 |

(Continued)

*Primary Examiner* — Cindy Trandai
(74) *Attorney, Agent, or Firm* — Crowell & Moring LLP

(57) ABSTRACT

Provided is a communication system that includes an electronic timepiece and a communication apparatus, in which, when the electronic-timepiece communication unit demands a communication connection to the communication apparatus, the communication-apparatus control unit inquires whether or not the electronic timepiece is included in the connection approval list that is stored in the communication-apparatus storage unit, in which, in a case where the electronic timepiece is included in the connection approval list, the communication-apparatus communication unit establishes a communication connection to the electronic timepiece and performs data communication through which at least clock time data is sent to the electronic timepiece, and in which, in a case where the electronic timepiece is not included in the connection approval list, the communication-apparatus communication unit does not establish the communication connection to the electronic timepiece.

12 Claims, 9 Drawing Sheets

(A)

(B)

(C)

(56) References Cited

U.S. PATENT DOCUMENTS

| | | | | |
|---|---|---|---|---|
| 2016/0212783 | A1* | 7/2016 | Hampapuram | G16H 40/63 |
| 2017/0098256 | A1* | 4/2017 | Long | G06F 16/9535 |
| 2017/0325047 | A1* | 11/2017 | Park | G06F 3/0488 |
| 2018/0009108 | A1* | 1/2018 | Yamamoto | G01C 21/206 |
| 2018/0053331 | A1* | 2/2018 | Jia | H04L 12/66 |
| 2018/0101137 | A1* | 4/2018 | Cheung | G04C 3/146 |
| 2018/0372365 | A1* | 12/2018 | Nagasaka | F24F 11/62 |
| 2019/0361694 | A1* | 11/2019 | Gordon | G06F 1/1626 |

FOREIGN PATENT DOCUMENTS

| | | |
|---|---|---|
| JP | 2015-184236 A | 10/2015 |
| JP | 2017-126951 A | 7/2017 |

\* cited by examiner

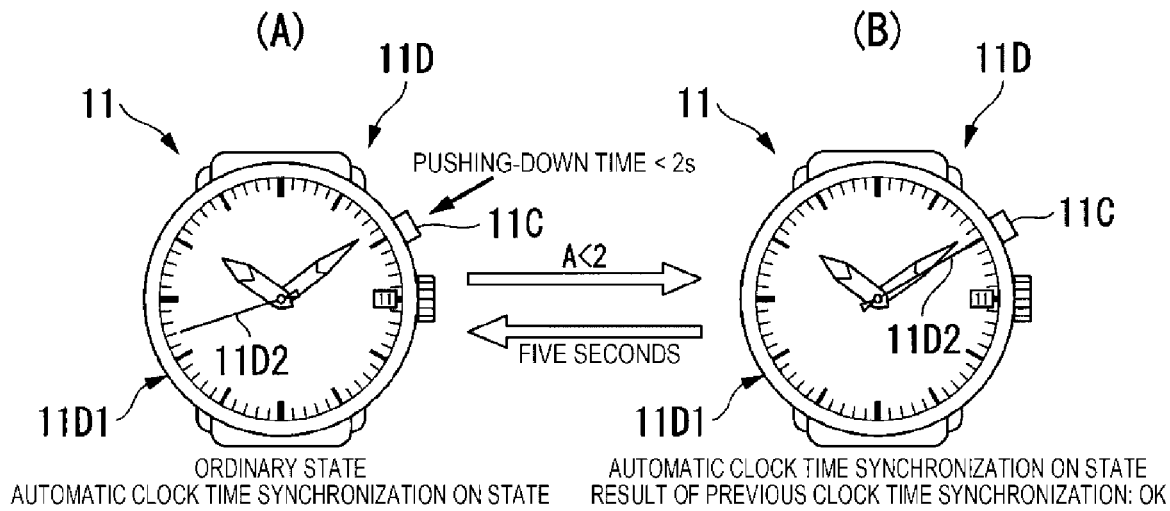
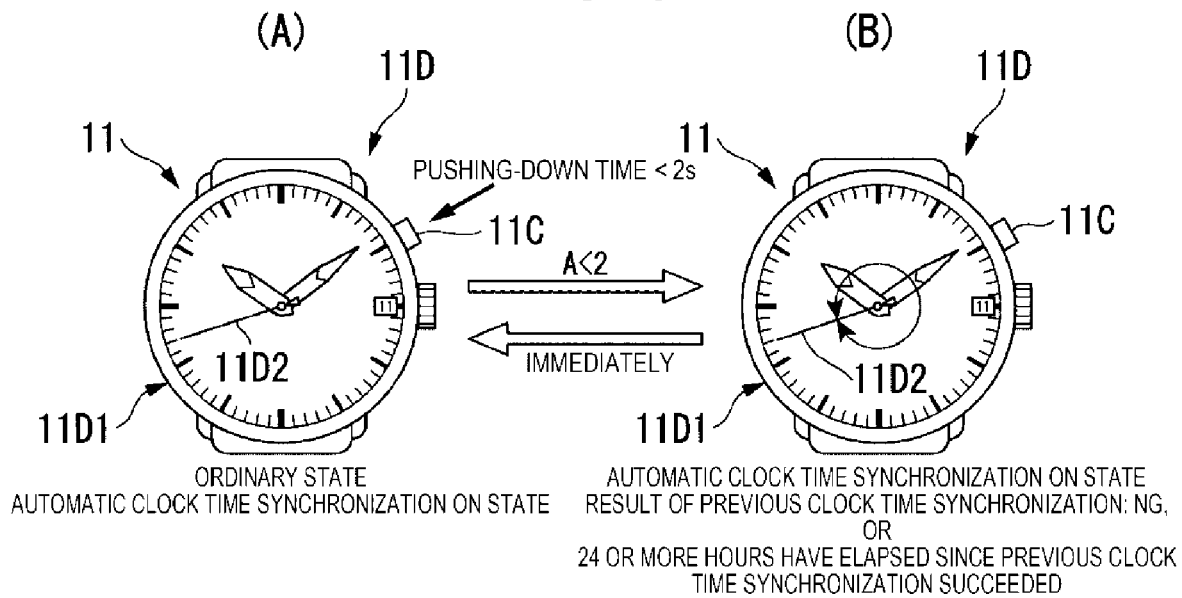

FIG. 8
(A)
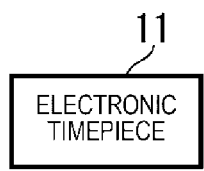
(B)
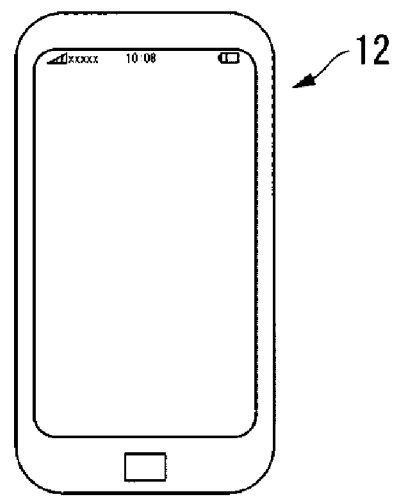
CONNECTION REQUEST
ESTABLISH CONNECTION IF TIMEPIECE THAT IS INCLUDED IN CONNECTION APPROVAL LIST IS PRESENT
TRANSMIT CLOCK TIME DATA

COMMUNICATION SYSTEM, COMMUNICATION METHOD, ELECTRONIC TIMEPIECE, AND COMMUNICATION APPARATUS

RELATED APPLICATIONS

This application claims priority under 35 U.S.C. § 119 to Japanese Patent Application No. 2018-045402 filed on Mar. 13, 2018, the entire content of which is hereby incorporated by reference.

BACKGROUND OF THE INVENTION

1. Field of the Invention

The present disclosure relates to a communication system, a communication method, an electronic timepiece, and a communication apparatus.

2. Description of the Related Art

Electronic timepieces (hereinafter referred to a "timepiece") each of which has a function of performing communication with communication apparatuses (hereinafter referred to as a "communication apparatus"), such as a smartphone, are present in the related art. For example, in a case where, for communication, the communication apparatus and the timepiece make connections to each other using Bluetooth (a registered trademark), generally, the communication apparatus and the timepiece are paired with each other and thus communication is performed between the communication apparatus and the timepiece. During the pairing, pieces of information on the communication apparatus and the timepiece are stored in each other. For this reason, in order to interrupt a paired state, there is a need to erase the pieces of pairing information that are stored in both the communication apparatus and the timepiece. For this reason, in a case where only the pairing information that is retained in one of the communication apparatus and the timepiece is erroneously erased and the pairing information that is retained in the other remains, a connection cannot be made. Furthermore, because the apparatus which cannot make a connection and from which the pairing information is not erased performs communication based on the remaining pairing information, there is a concern that a state in which a new connection cannot also be established will be entered. For this reason, there is a problem to be solved in that a user cannot understand why the connection cannot be made and thus has a distrust of the apparatus in question. Accordingly, it is also considered that the pairing is not performed. In this case, when, for example, clock time data and the like are set to be used for the purpose of exchange in a state in which a person is not periodically attentive, there is a concern that a connection will be indiscriminately made to a timepiece that is advertising a universally unique identifier (UUID) of a service that is expected, an apparatus name, or both, for example, a concern that a connection will be made to an unintended apparatus.

Disclosed in JP-A-5-14488 is an "information processing apparatus that includes means which edits or registers identification information list of counterpart stations, data communication with each of which is approved or prohibited, and control means which approves or prohibits an incoming call in data communication based on the identification information list". At this point, such a function is realized by registering a telephone number in a list. However, in a case where the technology is set to be used in combination of the timepiece, a number that is allocated to the timepiece is a Bluetooth address. Because of this, a user cannot usually recognize the address and has difficulty in registering the address in the list. Particularly, in an analog display timepiece, only a hand is display means, and because of this, an identification number of the timepiece is difficult to display.

Disclosed in JP-A-2011-204246 is a technology in which "identification information of a device is acquired, and in a case where the acquired identification information is identification information that does not relate to a connection which is established, a screen for checking that a connection is established is displayed". However, in a case where this technology finds application in short-distance wireless communication, there are many more timepieces that are connection targets than in proximity communication. Because of this, in a case where, using a service UUID that is expected, it is determined to which timepiece a connection has to be first made, whenever a timepiece that has the same service UUID demands a connection, the inquiry as to whether or not to establish the connection is required. Thus, convenience is decreased.

Disclosed in JP-A-2017-126951 is a "method in which identification information on an application of an external apparatus is notified to the electronic timepiece side, an identification signal of an electronic timepiece is registered in the application of the external apparatus, pieces of identification information on counterpart apparatuses that are to communicate with each other are retained in each other, and the counterpart apparatus, communication with which is to be performed, is selected". However, with this method, as is the case with the pairing, the apparatuses have pieces of identification information on each other. Thus, when under a specific condition, the identification information on one of the apparatuses is missing, a new connection is difficult to establish.

Furthermore, generally, the timepiece mostly has a small number of buttons, and various functions are realized using a time difference in continuously performing pushing, or the like.

Disclosed in JP-A-2015-184236 is a technology in which, using a time difference in continuously pushing down on a button, "a basic timepiece mode is entered when the button is continuously pushed down for a fixed time and switching between a state where electromagnetic wave means operates and a state where electromagnetic wave means does not operate takes place when the button is further pushed down". However, at this point, because switching between a connection-approved state and a connection-prohibited state takes place, in a case where it is not correctly known whether or not a current state is the connection-approved state or the connection-prohibited state, there is a concern that an approval will be issued erroneously when an operation of entering the connection-prohibited state is erroneously performed regardless of the fact that the current state is the connection-prohibited state. For this reason, there is a need to display a current connection-approved or connection-prohibited state, and for example, there is a disadvantage in terms of size and cost.

SUMMARY OF THE INVENTION

In view of the problems described above, each of embodiments of the invention provides a communication system, a communication method, an electronic timepiece, and a communication apparatus that are capable of simply making a connection for communication between the electronic timepiece and the communication apparatus without the need for pairing.

According to an embodiment of the invention, there is provided a communication system including: an electronic timepiece; and a communication apparatus, in which the electronic timepiece includes an electronic-timepiece communication unit that performs communication with the communication apparatus, and an electronic-timepiece control unit that controls the electronic-timepiece communication unit, in which the communication apparatus includes a communication-apparatus communication unit that performs communication with the electronic timepiece, a communication-apparatus storage unit in which a connection approval list is stored, and a communication-apparatus control unit that controls the communication-apparatus communication unit, in which, when the electronic-timepiece communication unit demands a communication connection to the communication apparatus, the communication-apparatus control unit inquires whether or not the electronic timepiece is included in the connection approval list that is stored in the communication-apparatus storage unit, in which, in a case where the electronic timepiece is included in the connection approval list, the communication-apparatus communication unit establishes a communication connection to the electronic timepiece and performs data communication through which at least clock time data is sent to the electronic timepiece, and, in a case where the electronic timepiece is not included in the connection approval list, the communication-apparatus communication unit does not establish the communication connection to the electronic timepiece.

In the communication system according to the embodiment of the invention, the communication apparatus may retain a connection approval list addition state in which an addition is made to the connection approval list, the communication apparatus may include a communication-apparatus operation unit on which a user of the communication system performs an operation, in a case where the communication apparatus is in the connection approval list addition state, the communication-apparatus control unit may make a search of electronic timepieces that include any other electronic timepiece which is not included in the connection approval list and a selection operation of determining whether or not to add the electronic timepiece that is discovered as a result of the search to the connection approval list may be performed by the user, on the communication-apparatus operation unit, and, in a case where the communication apparatus is not in the connection approval list addition state, the communication-apparatus control unit may not make a search of the any other electronic timepiece and the selection operation may not be performed on the communication-apparatus operation unit.

In the communication system according to the embodiment of the invention, the electronic timepiece may include an electronic-timepiece operation unit in the form of a button on which the user of the communication system performs an operation, the electronic timepiece may enter a clock time synchronization starting guidance state in which an approval of the communication connection to the communication apparatus is demanded, by the electronic-timepiece operation unit being pushed down for a long duration, in a case where the electronic timepiece is in the clock time synchronization starting guidance state, when the electronic-timepiece operation unit is caused to return to its original position, the electronic-timepiece communication unit may start to perform forced communication with the communication apparatus, may transmit a connection request signal to the communication apparatus, and may make a request to establish the communication connection to the communication apparatus, and, when the communication connection is established between the electronic timepiece and the communication apparatus, the electronic-timepiece communication unit may enter a state in which periodic automatic communication is performed between the electronic timepiece and the communication apparatus.

In the communication system according to the embodiment of the invention, in a case where the electronic timepiece is in the clock time synchronization starting guidance state, when the electronic-timepiece operation unit is further pushed down for the long duration, the electronic-timepiece control unit may interrupt the state in which the periodic automatic communication is performed.

In the communication system according to the embodiment of the invention, in a case where the electronic timepiece is in the state in which the periodic automatic communication is performed, the electronic-timepiece communication unit may automatically and periodically make a request to the communication apparatus to establish the communication connection without an operation being performed by the user of the communication system, in which, when detecting the request to establish the communication connection, which is made by the electronic-timepiece communication unit, the communication apparatus may inquire whether or not the electronic timepiece is included in the connection approval list, in which, in a case where the electronic timepiece is included in the connection approval list, the communication-apparatus communication unit may approve the communication connection to the electronic timepiece, may automatically make the communication connection to the electronic timepiece, and may transmit at least clock time data to the electronic timepiece, and in which, in a case where the electronic timepiece is not included in the connection approval list, the communication-apparatus communication unit may not establish the communication connection to the electronic timepiece.

In the communication system according to the embodiment of the invention, the electronic-timepiece control unit may determine operation of the electronic timepiece based on whether or not a specific command that is included in the clock time data is transmitted from the communication apparatus.

In the communication system according to the embodiment of the invention, the communication-apparatus operation unit may have a function of erasing information on the electronic timepiece that is registered in the connection approval list.

In the communication system according to the embodiment of the invention, although the electronic-timepiece communication unit is in a state in which a request is automatically and periodically made to the communication apparatus to establish the communication connection without the operation being performed by the user of the communication system, when the electronic-timepiece operation unit is pushed down for the long duration and thus the electronic timepiece enters the clock time synchronization starting guidance state, the electronic-timepiece communication unit may be in the state in which the request is automatically and periodically made to the communication apparatus to establish the communication connection, with a starting point being set to be a point in time that is included in a period of time from a point in time at which the clock time synchronization starting guidance state is entered, through a point in time at which forced communication is started and a point in time at which the communication connection is established, to a point in time at which the clock time data is received after the communication connection is established.

In the communication system according to the embodiment of the invention, the electronic-timepiece communication unit may transmit a different connection request signal in a case where a request is made to the communication apparatus to establish the communication connection in the clock time synchronization starting guidance state, and in a case where a request is automatically and periodically made to the communication apparatus to establish the communication connection without the operation being performed by the user of the communication system, and, among other electronic timepieces that are not included in the connection approval list, the communication apparatus may not add to the connection approval list any other electronic timepiece that automatically and periodically makes a request to establish the communication connection and may add to the connection approval list any other electronic timepiece that makes a request to establish the communication connection in a state where the forced communication starts.

In the communication system according to the embodiment of the invention, the communication-apparatus control unit may automatically erase from the connection approval list the electronic timepiece that does not establish the communication connection to the communication apparatus for a fixed period of time or longer, without an operation being performed by a user of the communication system.

In the communication system according to the embodiment of the invention, the communication apparatus may include a reception signal strength detection unit that detects reception signal strength, and, in a case where reception signal strength of the any other electronic timepiece that demands the communication connection from the communication apparatus is at or above a fixed value, the selection operation of determining whether or not to add the any other electronic timepiece to the connection approval list, on the communication-apparatus operation unit.

According to an embodiment of the invention, there is provided a method of communication between an electronic timepiece and a communication apparatus, in which the electronic timepiece includes an electronic-timepiece communication unit that performs communication with the communication apparatus, and an electronic-timepiece control unit that controls the electronic-timepiece communication unit, in which the communication apparatus includes a communication-apparatus communication unit that performs communication with the electronic timepiece, a communication-apparatus storage unit in which a connection approval list is stored, and a communication-apparatus control unit that controls the communication-apparatus communication unit the method including: a first step of enabling the communication-apparatus control unit to inquire whether or not the electronic timepiece is included in the connection approval list that is stored in the communication-apparatus storage unit, when the electronic-timepiece communication unit demands a communication connection to the communication apparatus; a second step of enabling the communication-apparatus communication unit to establish a communication connection to the electronic timepiece and to perform data communication through which at least clock time data is sent to the electronic timepiece, in a case where the electronic timepiece is included in the connection approval list; and a third step of enabling the communication-apparatus communication unit not to establish the communication connection to the electronic timepiece, in a case where the electronic timepiece is not included in the connection approval list.

According to an embodiment of the invention, there is provided an electronic timepiece that performs communication with a communication apparatus, the timepiece including: an electronic-timepiece communication unit that performs communication with the communication apparatus; and an electronic-timepiece control unit that controls the electronic-timepiece communication unit, in which the communication apparatus includes a communication-apparatus communication unit that performs communication with the electronic timepiece, a communication-apparatus storage unit in which a connection approval list is stored, and a communication-apparatus control unit that controls the communication-apparatus communication unit, in which, when the electronic-timepiece communication unit demands a communication connection to the communication apparatus, the communication-apparatus control unit inquires whether or not the electronic timepiece is included in the connection approval list that is stored in the communication-apparatus storage unit, in which, in a case where the electronic timepiece is included in the connection approval list, the communication-apparatus communication unit establishes a communication connection to the electronic timepiece and performs data communication through which at least clock time data is sent to the electronic timepiece, and in which, in a case where the electronic timepiece is not included in the connection approval list, the communication-apparatus communication unit does not establish the communication connection to the electronic timepiece.

According to an embodiment of the invention, there is provided a communication apparatus that performs communication with an electronic timepiece, the apparatus including: a communication-apparatus communication unit that performs communication with the electronic timepiece; a communication-apparatus storage unit in which a connection approval list is stored; and a communication-apparatus control unit that controls the communication-apparatus communication unit, in which the electronic timepiece includes an electronic-timepiece communication unit that performs communication with the communication apparatus, and an electronic-timepiece control unit that controls the electronic timepiece communication unit, in which, when the electronic-timepiece communication unit demands a communication connection to the communication apparatus, the communication-apparatus control unit inquires whether or not the electronic timepiece is included in the connection approval list that is stored in the communication-apparatus storage unit, in which, in a case where the electronic timepiece is included in the connection approval list, the communication-apparatus communication unit establishes a communication connection to the electronic timepiece and performs data communication through which at least clock time data is sent to the electronic timepiece, and in which, in a case where the electronic timepiece is not included in the connection approval list, the communication-apparatus communication unit does not establish the communication connection to the electronic timepiece.

BRIEF DESCRIPTION OF THE DRAWINGS

FIG. 2 is a diagram for describing transitioning of a state of an electronic timepiece from a first state A to a state B1 of a second state B.

FIG. 3 is a diagram for describing the transitioning of the state of the electronic timepiece from the first state A to a state B2 of the second state B.

FIG. 8 is a diagram for describing an example of the communication between the electronic timepiece and the communication apparatus in the case that is illustrated in each of FIG. 7.

DETAILED DESCRIPTION OF THE PREFERRED EMBODIMENTS

A communication system, a communication method, an electronic timepiece, and a communication apparatus according to an embodiment of the invention will be described below with reference to the drawings.

First Embodiment

Figure 1A:
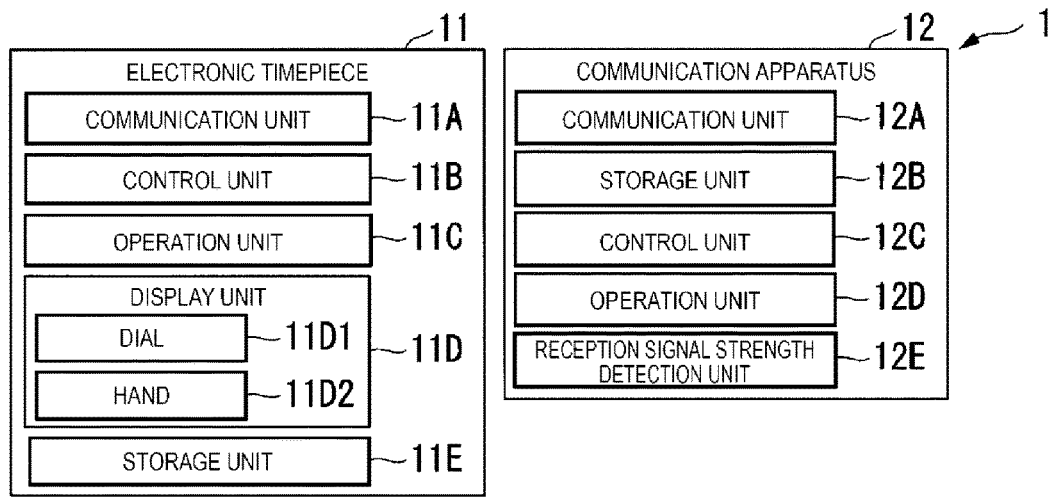
FIGS. 1A and 1B are diagrams, each illustrating an outline configuration or the like of a communication system according to a first embodiment.
Figure 1B:
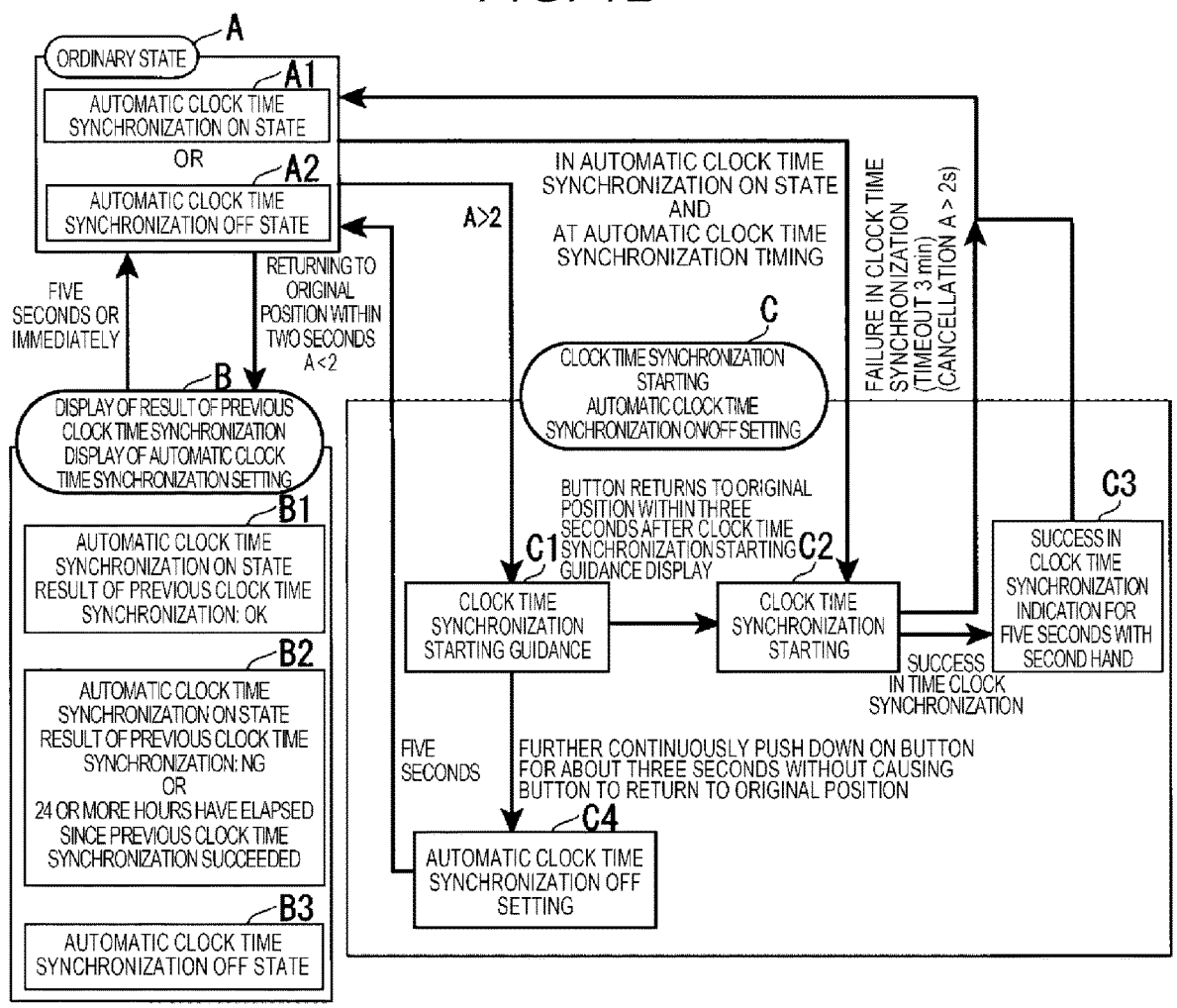

FIGS. 1A and 1B are diagrams, each illustrating an outline configuration or the like of a communication system 1 according to a first embodiment. In detail, FIG. 1A is a diagram illustrating an example of the outline configuration of the communication system 1 according to the first embodiment. FIG. 1B is a diagram for describing transition of a state of an electronic timepiece 11 that constitutes one portion of the communication system 1.

In an example that is illustrated in FIG. 1A, the communication system 1 includes an electronic timepiece 11 and a communication apparatus 12. As an example of the electronic timepiece 11, a timepiece that displays a clock time in analog display is described. The electronic timepiece 11 may be a digital timepiece without a hand, and may be a so-called combination quartz timepiece in which both analog display and digital display are available. The electronic timepiece 11 includes a communication unit 11A, a control unit 11B, an operation unit 11C, a display unit 11D, and a storage unit 11E. The communication unit 11A, for example, performs communication with the communication apparatus 12 through short-distance wireless communication such as Bluetooth (a registered trademark). The control unit 11B performs control of the communication unit 11A and the like. A user of the communication system 1 (in detail, for example, a wearer of the electronic timepiece 11) performs an operation on the operation unit 11C. The operation unit 11C is configured, for example, in the form of a button, and the user of the communication system 1 performs a pushing-down operation on the operation unit 11C. The display unit 11D includes a dial 11D1 and a hand 11D2. A clock time is displayed with the dial 11D1 and the hand 11D2 on the display unit 11D. Stored in the storage unit 11E are a pushing-down time of the operation unit 11C necessary for various operations, a time interval for which automatic clock time synchronization is performed, and the like.

Examples of the communication apparatus 12 include a smartphone, a portable telephone terminal, a tablet terminal, and the like. The communication apparatus 12 includes a communication unit 12A, a storage unit 12B, a control unit 12C, an operation unit 12D, and a reception signal strength detection unit 12E. The communication unit 12A performs communication with the electronic timepiece 11. Furthermore, the communication unit 12A acquires clock time data that will be described below. A connection approval list that will be described below, and the like are stored in the storage unit 12B. The control unit 12C performs control of the communication unit 12A and the like. The user (in detail, for example, a person who has the communication apparatus 12 with himself/herself) of the communication system 1 performs an operation on the operation unit 12D. The reception signal strength detection unit 12E detects reception signal strength that is strength of a signal that is received by the communication unit 12A. The reception signal strength detection unit 12E, for example, detects strength of a signal that is transmitted by the communication unit 11A of the electronic timepiece 11 and is received by the communication unit 12A.

In an example that is illustrated in FIG. 1A, the communication unit 12A of the communication apparatus 12 has a function of acquiring the clock time data that is current clock time data. The communication unit 12A, for example, acquires the clock time data by having access to a clock time server on the Internet.

In another example, communication unit 12A may acquire the clock time data by using global positioning system (GPS), or may acquire the clock time data by receiving a control signal from a base station.

In the example that is illustrated in FIG. 1A, the electronic timepiece 11 has a function in which the clock time data that is acquired from the communication apparatus 12 is received and in which, based on the received clock time data, a clock time that is indicated by the dial 11D1 and the hand 11D2 is corrected. In detail, the electronic timepiece 11 has a mode (an automatic clock time synchronization setting ON mode) in which the clock time data is received from the communication apparatus 12, for example, in a fixed time interval such as every 24 hours and the clock time is corrected based on the received clock time data, and a mode (an automatic clock time synchronization setting OFF mode) in which a correction of the clock time is not made without receiving the clock time data from the communication apparatus 12.

In an example that is illustrated in FIG. 1B, the electronic timepiece 11 has a first state A, a second state B, and a third state C, and switches among these states.

The first state A is an ordinary state in which the electronic timepiece 11 displays a clock time. The ordinary states (the first state A) include an automatic clock time synchronization ON state A1 and an automatic clock time synchronization OFF state A2. More precisely, in a case where the ordinary state (the first state A) is entered, the electronic timepiece 11 enters any one of the automatic clock time synchronization ON state A1 and the automatic clock time synchronization OFF state A2.

The second state B is a state in which it is indicated whether an automatic clock time synchronization setting of the electronic timepiece 11 is configured to be ON or is configured to be OFF. In the second state B, it is also indicated whether a previous clock time synchronization is normally performed (OK) or the previous clock time synchronization is not normally performed (NG). The second state B includes a state B1, a state B2, and a state B3.

The state B1 is a state in which it is indicated that the automatic clock time synchronization setting of the electronic timepiece 11 is configured to be ON, and is a state in which it is indicated that the previous clock time synchronization is normally performed (OK).

The state B2 is a state in which it is indicated that the automatic clock time synchronization setting of the electronic timepiece 11 is configured to be ON, and is a state in which it is indicated that the previous clock time synchronization is not normally performed (NG), or in which it is indicated that 24 or more hours have elapsed since the previous clock time synchronization succeeded.

The state B3 is a state in which it is indicated that the automatic clock time synchronization setting of the electronic timepiece 11 is configured to be OFF.

When the user (in detail, for example, the wearer of the electronic timepiece 11) of the communication system 1 pushes down on the operation unit 11C of the electronic timepiece 11 in the ordinary state (the first state A) and then causes the operation unit 11C to return to its original position, for example, within two or more seconds, a state of the electronic timepiece 11 transitions from the first state A to the state B1, B2, or B3 of the second state B.

Figure 4:
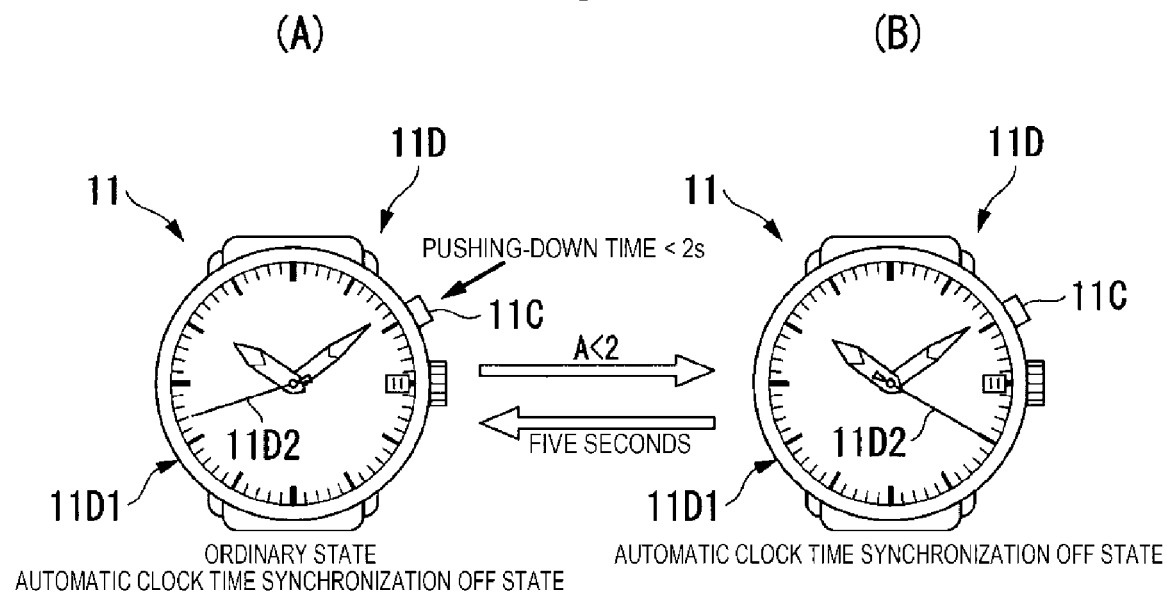
FIG. 4 is a diagram for describing the transitioning of the state of the electronic timepiece from the first state A to a state B3 of the second state B.

FIGS. 2 to 4 are diagrams, each for describing the transitioning of the state of the electronic timepiece 11 from the first state A to the second state B. In detail, FIG. 2 is a diagram for describing the transitioning of the state of the electronic timepiece 11 from the first state A to the state B1 of the second state B. FIG. 3 is a diagram for describing the transitioning of the state of the electronic timepiece 11 from the first state A to the state B2 of the second state B. FIG. 4 is a diagram for describing the transitioning of the state of the electronic timepiece 11 from the first state A to the state B3 of the second state B.

As illustrated in FIGS. 1B and 2, when the wearer of the electronic timepiece 11 pushes down on the operation unit 11C of the electronic timepiece 11 in the ordinary state (the first state A) (in detail, the automatic clock time synchronization ON state A1) and then causes the operation unit 11C to return to its original position, for example, within two seconds, the state of the electronic timepiece 11 transitions from the first state A (refer to (A) of FIG. 2) to the state B1 (refer to (B) of FIG. 2) of the second state B.

In detail, a second hand of the electronic timepiece 11 moves from a position (the first state A) indicating a current clock time to a position (the state B1) indicating "two o'clock". In a case where an amount of movement from a second hand of the electronic timepiece 11 from the position (the first state A) indicating the current clock time to the position (the state B1) indicating "two o'clock" is less than 30°, the second hand of the electronic timepiece 11 rotates by 360° from the position (the first state A) indicating the current clock time and then moves to the position (the state B1) indicating "two o'clock".

As a result, with the display on the electronic timepiece 11 that is illustrated in (B) of FIG. 2, the wearer of the electronic timepiece 11 can recognize that the automatic clock time synchronization setting of the electronic timepiece 11 is configured to be ON and that the previous clock time synchronization is normally performed (OK).

The display on the electronic timepiece 11, which is illustrated in (B) of FIG. 2, is maintained, for example, for five seconds, and subsequently, the state of the electronic timepiece 11 transitions from the state B1 (refer to (B) of FIG. 2) to the first state A (refer to (A) of FIG. 2). As a result, with the display on the electronic timepiece 11, which is illustrated in (A) of FIG. 2, the wearer of the electronic timepiece 11 can again recognize the current clock time.

As illustrated in FIGS. 1B and 3, when the wearer of the electronic timepiece 11 pushes down on the operation unit 11C of the electronic timepiece 11 in the ordinary state (the first state A) (which, in detail, is the automatic clock time synchronization ON state A1 and is the state in which the previous clock time synchronization is not normally performed (NG state)) and then causes the operation unit 11C to return to its original position, for example, within two seconds, the state of the electronic timepiece 11 transitions from the first state A (refer to (A) of FIG. 3) to the state B2 (refer to (B) of FIG. 3) of the second state B.

In detail, the second hand of the electronic timepiece 11 rotates by 360° (the state B2), as illustrated in (B) of FIG. 3, from the position (the first state A) indicating the current clock time and immediately returns to the position (the first state A) indicating the current clock time.

As a result, with the movement of the second hand of the electronic timepiece 11, which is illustrated in (B) of FIG. 3, the wearer of the electronic timepiece 11 can recognize that the automatic clock time synchronization setting of the electronic timepiece 11 is configured to be ON, and that the previous clock time synchronization is not normally performed (NG) or that 24 or more hours have elapsed since the previous clock time synchronization succeeded.

Furthermore, with the display on the electronic timepiece 11, which is illustrated in (A) of FIG. 3, the wearer of the electronic timepiece 11 can again recognize the current clock time.

As illustrated in FIGS. 1B, and 4, when the wearer of the electronic timepiece 11 pushes down on the operation unit 11C of the electronic timepiece 11 in the ordinary state (the first state A) (in detail, the automatic clock time synchronization OFF state A2) and then causes the operation unit 11C to return to its original position, for example, within two seconds, the state of the electronic timepiece 11 transitions from the first state A (refer to (A) of FIG. 4) to the state B3 (refer to (B) of FIG. 4) of the second state B.

In detail, the second hand of the electronic timepiece 11 transitions from the position (the first state A) indicating the current clock time to a position (the state B3) indicating "four o'clock" In a case where an amount of the movement of the second hand of the electronic timepiece 11 from the position (the first state A) indicating the current clock time to the position (the state B3) indicating "four o'clock" is less than 30°, the second hand of the electronic timepiece 11 rotates by 360° from the position (the first state A) indicating the current clock time and then moves to the position (the state B3) indicating "four o'clock".

As a result, with the display on the electronic timepiece 11, which is illustrated in (B) of FIG. 4, the wearer of the electronic timepiece 11 can recognize that the automatic clock time synchronization setting of the electronic timepiece 11 is configured to be OFF.

The display on the electronic timepiece 11, which is illustrated in (B) of FIG. 4, is maintained, for example, for five seconds, and subsequently, the state of the electronic timepiece 11 transitions from the state B3 (refer to (B) of FIG. 4) to the first state A (refer to (A) of FIG. 4). As a result, with the display on the electronic timepiece 11, which is illustrated in (A) of FIG. 4, the wearer of the electronic timepiece 11 can again recognize the current clock time.

In the example that is illustrated in FIG. 1B, the third state C is a state in which the clock time synchronization of the electronic timepiece 11 starts, and in which the automatic clock time synchronization of the electronic timepiece 11 is configured to be ON or OFF, and so forth.

The third state C includes a state C1, a state C2, a state C3, and a state C4.

The state C1 is a state in which guidance is provided on starting the clock time synchronization of the electronic timepiece 11.

The state C2 is a state in which the clock time synchronization of the electronic timepiece 11 is started.

The state C3 is a state in which it is indicated that the clock time synchronization of the electronic timepiece 11 succeeds.

The state C4 is a state in which the automatic clock time synchronization setting of the electronic timepiece 11 is configured to be OFF.

If the user (in detail, for example, the wearer of the electronic timepiece 11) of the communication system 1 pushes down on the operation unit 11C of the electronic timepiece 11 in the ordinary state (the first state A) and then causes the operation unit 11C to return to its original position after, for example, a period of time longer than two seconds elapsed, the state of the electronic timepiece 11 transitions from the first state A to the third state C.

Figure 5:
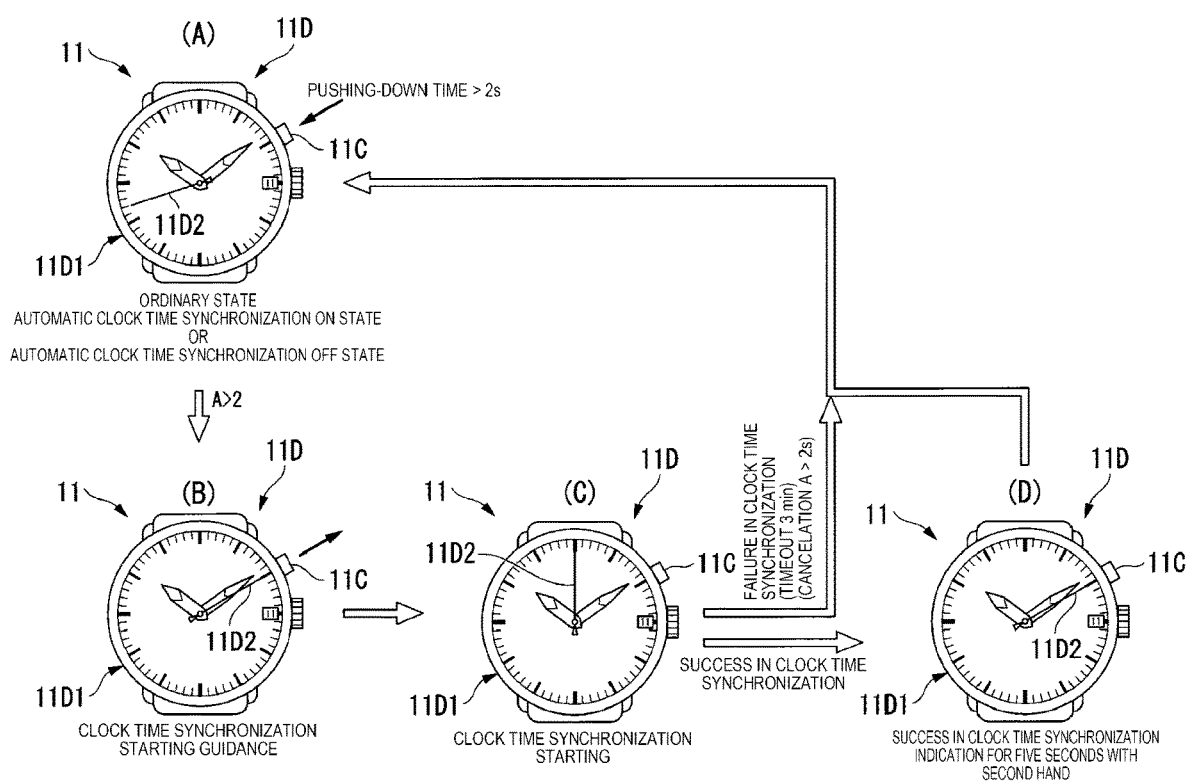
FIG. 5 is a diagram for describing an example of a first case where the state of the electronic timepiece transitions from the first state A to a third state C.

FIG. 5 is a diagram for describing an example in a first case where the state of the electronic timepiece 11 transitions from the first state A to the third state C.

As illustrated in FIGS. 1B and 5, when the wearer of the electronic timepiece 11 pushes down on the operation unit 11C of the electronic timepiece 11 in the ordinary state (the first state A) (which, in detail, is the automatic clock time synchronization ON state A1 or is the automatic clock time synchronization OFF state A2) and a period of time for which the wearer of the electronic timepiece 11 pushes down on the operation unit 11C is longer than, for example, two seconds (more precisely, when the wearer of the electronic timepiece 11 pushes down on the operation unit 11C for a long duration), the state of the electronic timepiece 11 transitions from the first state A (refer to (A) of FIG. 5) to the state (the clock time synchronization starting guidance state in which an approval of a communication connection to the communication apparatus 12 is demanded) C1 (refer to (B) of FIG. 5) of the third state C. In detail, the second hand of the electronic timepiece 11 moves from the position (the first state A) indicating the current clock time to the position (the state C1) indicating "two o'clock".

Subsequently, when the operation unit 11C is caused to return to its original position, for example, within three seconds after the state of the electronic timepiece 11 transitioned to the state C1 (refer to (B) of FIG. 5), the state of the electronic timepiece 11 transitions from the state C1 (refer to (B) of FIG. 5) of the third state C to the state C2 (refer to (C) of FIG. 5). In detail, the second hand of the electronic timepiece 11 moves from the position (the state C1) indicating "two o'clock" to a position (the state C2) indicating "twelve o'clock".

As described above, in the state C2, the clock time synchronization of the electronic timepiece 11 through the communication with the communication apparatus 12 is started.

Figure 6:
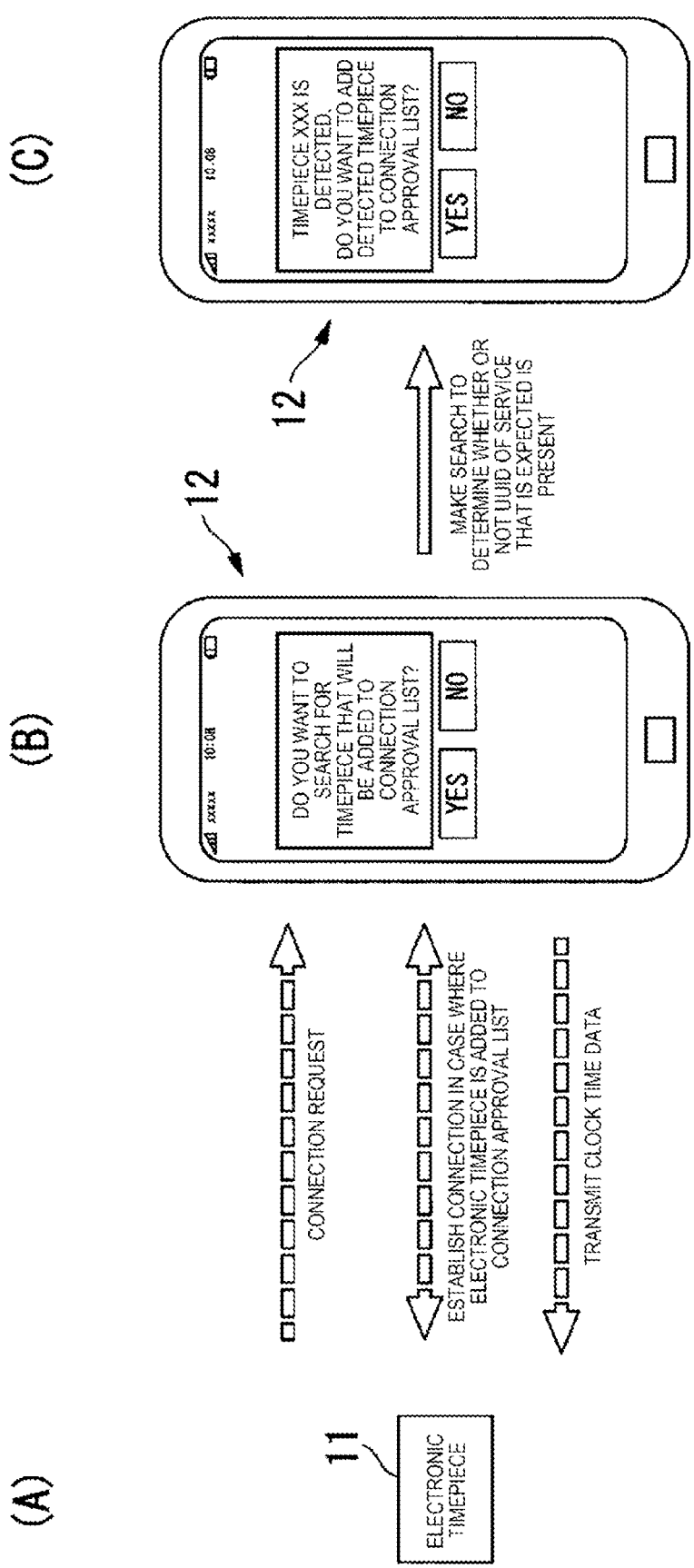
FIG. 6 is a diagram for describing an example of communication between the electronic timepiece and a communication apparatus in the case that is illustrated in each of FIG. 5.

FIG. 6 is a diagram for describing an example of communication between the electronic timepiece 11 and the communication apparatus 12 in the case that is illustrated in each of FIG. 5.

In an example that is illustrated in each of FIG. 6, when the state of the electronic timepiece 11 transitions from the state C1 (refer to (B) of FIG. 5) of the third state C to the state C2 (refer to (C) of FIG. 5), as is illustrated by a right-pointing arrow between (A) and (B) of FIG. 6, the communication unit 11A of the electronic timepiece 11 transmits a connection request that the communication connection to the communication apparatus 12 is demanded. In detail, the communication unit 11A of the electronic timepiece 11 transmits an advertising signal (the connection request signal) to the communication apparatus 12, and thus makes a request to establish the communication connection to the communication apparatus 12.

When the communication apparatus 12 receives the connection request from the electronic timepiece 11, for example, the control unit 12C of the communication apparatus 12 inquires whether or not the electronic timepiece 11 is included in the connection approval list that is stored in the storage unit 12B.

In a case where the electronic timepiece 11 is included in the connection approval list, more particularly, in a case where a Bluetooth address of the electronic timepiece 11, a universally unique identifier (UUID) that is designated by an operating system (OS), and the like are included in the connection approval list, as is indicated by a bidirectional arrow between (A) and (B) of FIG. 6, the communication unit 12A of the communication apparatus 12 establishes a communication connection to the electronic timepiece 11. Subsequently, as is indicated by a left-pointing arrow between (A) and (B) of FIG. 6, data communication through which at least the clock time data is sent to the electronic timepiece 11 is performed. More precisely, the clock time synchronization of the electronic timepiece 11 through the communication with the communication apparatus 12 succeeds.

Furthermore, the control unit 11B of the electronic timepiece 11 determines operation of the electronic timepiece 11 based on whether or not a specific command that is included in the clock time data is transmitted from the communication apparatus 12. For example, in a case where the specific command that is included in the clock time data is transmitted from the communication apparatus 12, the electronic timepiece 11 makes a correction of a clock time. In a case where the specific command that is included in the clock time data is not transmitted from the communication apparatus 12, the electronic timepiece 11 does not make a correction of a clock time. With this configuration, a concern (for example, a concern that a correction of a clock time will be erroneously made) that the electronic timepiece 11 will malfunction if the electronic timepiece 11 makes a connection to a wrong apparatus (an apparatus other than the communication apparatus 12) can be suppressed.

In a case where the electronic timepiece 11 is not included in the connection approval list, the communication unit 12A of the communication apparatus 12 does not establish the communication connection to the electronic timepiece 11.

In the case where the electronic timepiece 11 is not included in the connection approval list, the communication unit 12A of the communication apparatus 12 can also establish the communication connection to the electronic timepiece 11. In a case where the communication unit 12A establishes the communication connection to the electronic timepiece 11, the communication apparatus 12 adds the electronic timepiece 11 to the connection approval list. In detail, the communication apparatus 12, as indicated in (B) of FIG. 6, retains a connection approval list addition state in which an addition is made to the connection approval list.

In a case where the electronic timepiece 11 is not included in the connection approval list, if the communication apparatus 12 is in the connection approval list addition state, as illustrated in (B) of FIG. 6, the communication apparatus 12 displays, for example, the message to the effect that "Do you want to search for a timepiece that will be added to the connection approval list?" for the user of the communication system 1 (in detail, the person who has the communication apparatus 12 with himself/herself).

In a case where the user of the communication system 1 selects YES, for example, the control unit 12C of the communication apparatus 12 makes a search of electronic timepieces that include any other electronic timepiece (the electronic timepiece 11 in the example that is illustrated in FIG. 6) that is not included in the connection approval list.

In a case where the communication apparatus 12 detects the electronic timepiece 11 as any other electronic timepiece, the operation unit 12D of the communication apparatus 12, the user of the communication system 1 performs a selection operation of determining whether or not to add any other electronic timepiece (an electronic timepiece is discovered as a result of the search) (the electronic timepiece 11 in the example that is illustrated in FIG. 6), which demands a communication connection from the communication apparatus 12, to the connection approval list, on the communication apparatus 12.

In detail, in a case where the communication apparatus 12 detects the electronic timepiece 11, as illustrated in (C) of FIG. 6, the communication apparatus 12 displays, for example, the message to the effect that "A timepiece XXX (the electronic timepiece 11 in the example that is illustrated in FIG. 6) is detected. Do you want to add the detected timepiece XXX to the connection approval list?" for the user (in detail, the person that has the communication apparatus 12 with himself/herself) of the communication system 1.

In the case where the user of the communication system 1 selects YES, more precisely, in a case where the user of the communication system 1 makes a selection of the electronic timepiece 11 that is to be added to the connection approval list, the communication apparatus 12 adds the electronic timepiece 11 to the connection approval list. In a case where the communication apparatus 12 adds the electronic timepiece 11 to the connection approval list, the communication unit 12A of the communication apparatus 12, as is indicated by the bidirectional arrow between (A) and (B) of FIG. 6, establishes the communication connection to the electronic timepiece 11. Furthermore, the communication unit 12A, as indicated by the left-pointing arrow between (A) and (B) of FIG. 6, performs the data communication through which at least the clock time data is sent to the electronic timepiece 11.

On the other hand, in a case where the user of the communication system 1 selects NO, more precisely, in a case where the user of the communication system 1 makes a selection that the electronic timepiece 11 is not added to the connection approval list, the communication apparatus 12 does not add the electronic timepiece 11 to the connection approval list.

In a case where the communication apparatus 12 is not in the connection approval list addition state that is illustrated in (B) of FIG. 6, for example, the control unit 12C of communication apparatus 12 does not make a search of any other electronic timepiece (the electronic timepiece 11 in the example that is illustrated in FIG. 6). Furthermore, the user of the communication system 1 does not perform a selection operation on the operation unit 12D of the communication apparatus 12. More precisely, the communication apparatus 12 does not perform displaying as is illustrated in (B) and (C) of FIG. 6.

In the example that is illustrated in FIG. 6, as described above, the user of the communication system 1 performs the selection operation of determining whether or not to add the electronic timepiece 11 to the connection approval list, on the operation unit 12D of the communication apparatus 12.

In another example, the operation unit 12D of the communication apparatus 12 may have a function of batch-erasing the connection approval list (more precisely, a function of erasing information on an electronic timepiece that is registered in the connection approval list). In this example, the communication apparatus 12 has a mode in which the user of the communication system 1 performs the selection operation of determining whether or not to batch-erase the connection approval list. It is noted that the functions can include a batch-erasing function and a partly-erasing function.

With reference back to FIG. 5, when the clock time synchronization of the electronic timepiece 11 through the communication with the communication apparatus 12 succeeds, the state of the electronic timepiece 11 transitions from the state C2 (refer to (C) of FIG. 5) of the third state C to the state C3 (refer to (D) of FIG. 5). In detail, the second hand of the electronic timepiece 11 moves from the position (the state C2) indicating "twelve o'clock" to the position (the state C3) indicating "two o'clock".

As a result, with the display on the electronic timepiece 11, which is illustrated in (D) of FIG. 5, the wearer of the electronic timepiece 11 can recognize that the clock time synchronization of the electronic timepiece 11 through the communication with the communication apparatus 12 succeeded.

The display on the electronic timepiece 11, which is illustrated in (D) of FIG. 5, is maintained, for example, for five seconds, and subsequently, the state of the electronic timepiece 11 transitions from the state C3 (refer to (D) of FIG. 5) to the first state A (refer to (A) of FIG. 5). Based on the clock time data that is received from the communication apparatus 12, the electronic timepiece 11 corrects the clock time that is indicated by the dial 11D1 and the hand 11D2, and causes transitioning to the first state A (refer to (A) of FIG. 5) to take place. As a result, with the display on the electronic timepiece 11, which is illustrated in (A) of FIG. 5, the wearer of the electronic timepiece 11 can recognize the current clock time (in detail, a corrected current clock time).

In detail, when a communication connection between the electronic timepiece 11 and the communication apparatus 12 is established, a state is entered in which automatic communication (refer to FIGS. 6 and 7) is periodically (for example, every 24 hours) performed between the electronic timepiece 11 and the communication apparatus 12.

In a case where, in the state C2 (refer to (C) of FIG. 5) of the third state C, the clock time synchronization of the electronic timepiece 11 through the communication with the communication apparatus 12 fails, the clock time synchronization of the electronic timepiece 11 through the communication with the communication apparatus 12 is reattempted.

In a case where the clock time synchronization does not succeed, for example, within three minutes after the state of the electronic timepiece 11 transitioned to the state C2 (refer to (C) of FIG. 5), a timeout occurs, and the state of the electronic timepiece 11 transitions from the state C2 (refer to (C) of FIG. 5) to the first state A (refer to (A) of FIG. 5). As a result, with the display on the electronic timepiece 11, which is illustrated in (A) of FIG. 5, the wearer of the electronic timepiece 11 can again recognize the current clock time (however, the current clock time that is not corrected).

Even before, for example, three minutes have elapsed since the state of the electronic timepiece 11 transitioned to the state C2 (refer to (C) of FIG. 5), when the wearer of the electronic timepiece 11 pushes down on the operation unit 11C, for example, for second or more seconds, and then causes the operation unit 11C to return to its original position, the clock time synchronization is canceled. Accordingly, the state of the electronic timepiece 11 transitions from the state C2 (refer to (C) of FIG. 5) to the first state A (refer to (A) of FIG. 5). As a result, with the display on the electronic timepiece 11, which is illustrated in (A) of FIG. 5, the wearer of the electronic timepiece 11 can again recognize the current clock time (however, the current clock time that is not corrected).

Figure 7:
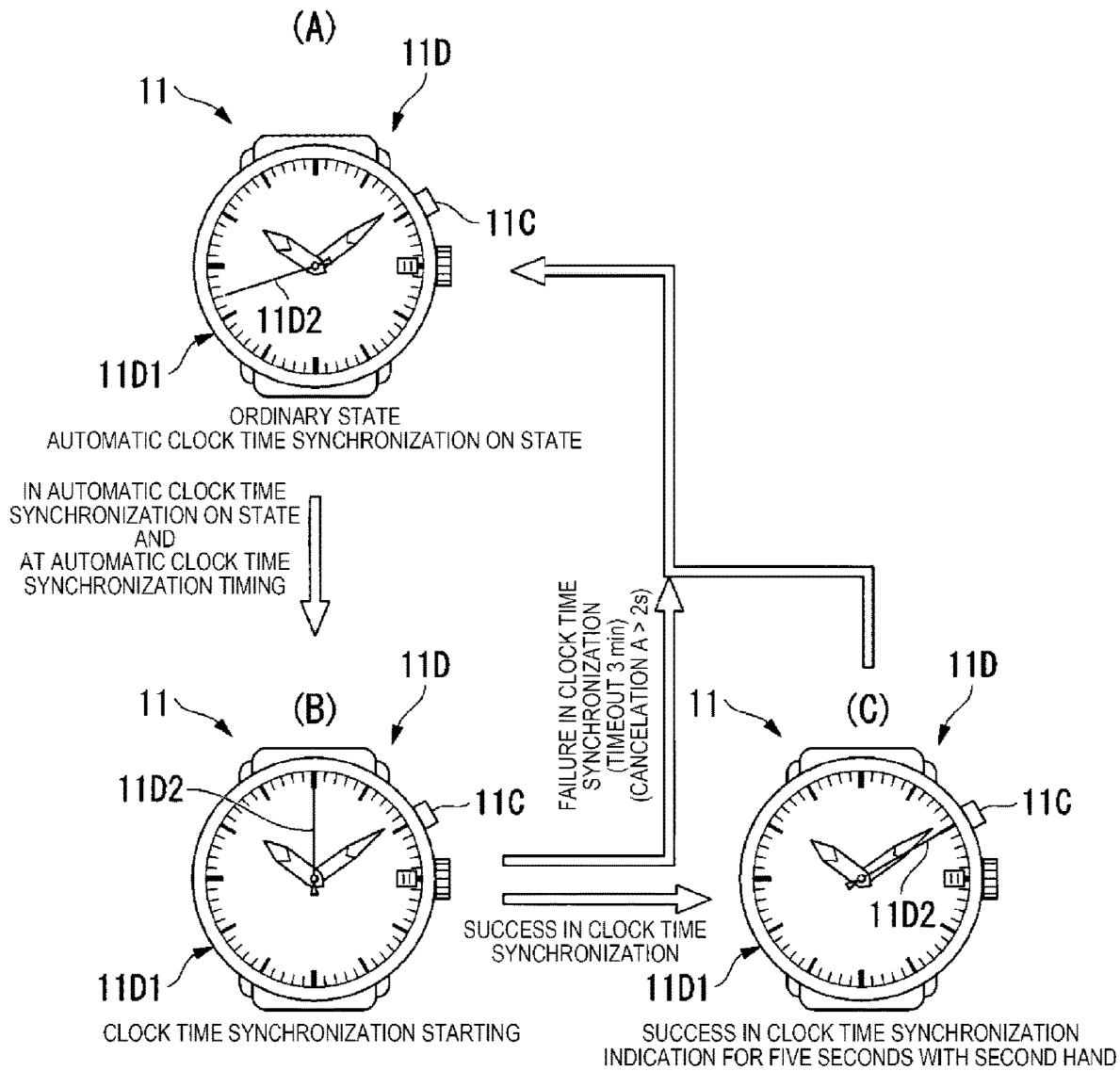
FIG. 7 is a diagram for describing an example of a second case where the state of the electronic timepiece transitions from the first state A to the third state C.

FIG. 7 is a diagram for describing an example in a second case where the state of the electronic timepiece 11 transitions from the first state A to the third state C.

In the above-described example that is illustrated in FIG. 5, because the state of the electronic timepiece 11 transitions from the first state A to the third state C, there is a need for the wearer of the electronic timepiece 11 to push down on the operation unit 11C. On the other hand, in the example that is illustrated in FIG. 7, because the state of the electronic timepiece 11 transitions from the first state A to the third state C, there is no need for the wearer of the electronic timepiece 11 to push down on the operation unit 11C. More precisely, an example that is illustrated in FIG. 7 is an example in which periodic automatic communication is performed.

As illustrated in FIGS. 1B and 7, in a case where the electronic timepiece 11 is in the automatic clock time synchronization ON state A1, when an automatic clock time synchronization timing arrives, for example, every 24 hours, the state of the electronic timepiece 11 transitions from the first state A (refer to (A) of FIG. 7) to the state C2 (refer to (B) of FIG. 7) of the third state C. In detail, the second hand of the electronic timepiece 11 moves from the position (the first state A) indicating the current clock time to the position (the state C2) indicating "twelve o'clock".

As described above, in the state C2, the clock time synchronization of the electronic timepiece 11 through the communication with the communication apparatus 12 is started.

FIG. 8 is a diagram for describing an example of the communication between the electronic timepiece 11 and the communication apparatus 12 in the case (the case in which the periodic automatic communication is performed) that is illustrated in FIG. 7.

In an example that is illustrated in FIG. 8, when the state of the electronic timepiece 11 transitions from the first state A (refer to (A) of FIG. 7) to the state C2 (refer to (B) of FIG. 7) of the third state C, as is illustrated by a right-pointing arrow between (A) and (B) of FIG. 8, the communication unit 11A of the electronic timepiece 11 transmits the connection request that the communication connection to the communication apparatus 12 is demanded. In detail, the communication unit 11A of the electronic timepiece 11 transmits the advertising signal to the communication apparatus 12, and thus makes a request to establish the communication connection to the communication apparatus 12.

More precisely, the communication unit 11A of the electronic timepiece 11, automatically and periodically, makes a request to the communication apparatus 12 to establish the communication connection without an operation (for example, an operation of pushing down on the operation unit 11C and then causing the operation unit 11C to return to its original position, which is indicated by an arrow in (A) of FIG. 5) being performed by the user of the communication system 1. A starting point of a duration during which the connection request is made automatically and periodically can be set to be a point in time that is included in a period of time from a point in time at which the forced communication guidance state (the state that is illustrated in (B) of FIG. 5) is entered, through a point in time (a point in time at which the state that is illustrated in (C) of FIG. 5 is entered) at which forced communication is started and a point in time (a point in time at which the state that is illustrated in (D) of FIG. 5 is entered) at which the communication connection is established, to a point in time at which the clock time data is received after the communication is established.

When the communication apparatus 12 receives the connection request from the electronic timepiece 11, for example, the control unit 12C of the communication apparatus 12 inquires whether or not the electronic timepiece 11 is included in the connection approval list that is stored in the storage unit 12B.

More precisely, when detecting a request to establish the communication connection, which is made by the communication unit 11A of the electronic timepiece 11, the communication apparatus 12 inquires whether or not the electronic timepiece 11 is included in the connection approval list.

In a case where the electronic timepiece 11 is included in the connection approval list, as is indicated by a bidirectional arrow between (A) and (B) of FIG. 8, the communication unit 12A of the communication apparatus 12 establishes the communication connection to the electronic timepiece 11. Furthermore, as is indicated in a left-pointing arrow between (A) and (B) of FIG. 8, the communication unit 12A performs the data communication through which at least the clock time data is sent to the electronic timepiece 11.

More precisely, in the case where the electronic timepiece 11 is included in the connection approval list, the communication unit 12A of the communication apparatus 12 approves the communication connection to the electronic timepiece 11, automatically makes the communication connection to the electronic timepiece 11, and transmits at least the clock time data to the electronic timepiece 11.

Based on the received clock time data, the electronic timepiece 11 corrects the clock time that is indicated by the dial 11D1 and the hand 11D2.

Furthermore, the control unit 11B of the electronic timepiece 11 determines the operation of the electronic timepiece 11 based on whether or not a specific command that is included in the clock time data is transmitted from the communication apparatus 12. For example, in a case where the specific command that is included in the clock time data is transmitted from the communication apparatus 12, the electronic timepiece 11 makes a correction of a clock time. In a case where the specific command that is included in the clock time data is not transmitted from the communication apparatus 12, the electronic timepiece 11 does not make a correction of a clock time. With this configuration, a concern (for example, a concern that a correction of a clock time will be erroneously made) that the electronic timepiece 11 will malfunction if the electronic timepiece 11 makes a connection to a wrong apparatus (an apparatus other than the communication apparatus 12) can be suppressed.

In the case where the electronic timepiece 11 is not included in the connection approval list, the communication unit 12A of the communication apparatus 12 does not establish the communication connection to the electronic timepiece 11.

With reference back to FIG. 7, when the clock time synchronization of the electronic timepiece 11 through the communication with the communication apparatus 12 succeeds, the state of the electronic timepiece 11 transitions from the state C2 (refer to (B) of FIG. 7) of the third state C to the state C3 (refer to (C) of FIG. 7). In detail, the second hand of the electronic timepiece 11 moves from the position (the state C2) indicating "twelve o'clock" to the position (the state C3) indicating "two o'clock".

As a result, with the display on the electronic timepiece 11, which is illustrated in (C) of FIG. 7, the wearer of the electronic timepiece 11 can recognize that the clock time synchronization of the electronic timepiece 11 through the communication with the communication apparatus 12 succeeds.

The display on the electronic timepiece 11, which is illustrated in (C) of FIG. 7, is maintained, for example, for five seconds, and subsequently, the state of the electronic timepiece 11 transitions from the state C3 (refer to (C) of FIG. 7) to the first state A (refer to (A) of FIG. 7). Based on the clock time data that is received from the communication apparatus 12, the electronic timepiece 11 corrects the clock time that is indicated by the dial 11D1 and the hand 11D2, and causes transitioning to the first state A (refer to (A) of FIG. 7) to take place. As a result, with the display on the electronic timepiece 11, which is illustrated in (A) of FIG. 7, the wearer of the electronic timepiece 11 can recognize the current clock time (in detail, a corrected current clock time).

In a case where in the state C2 (refer to (B) of FIG. 7) of the third state C, the clock time synchronization of the electronic timepiece 11 through the communication with the communication apparatus 12 fails, the clock time synchronization of the electronic timepiece 11 through the communication with the communication apparatus 12 is reattempted.

In a case where the clock time synchronization does not succeed, for example, within three minutes after the state of the electronic timepiece 11 transitioned to the state C2 (refer to (B) of FIG. 7), a timeout occurs, and the state of the electronic timepiece 11 transitions from the state C2 (refer to (B) of FIG. 7) to the first state A (refer to (A) of FIG. 7). As a result, with the display on the electronic timepiece 11, which is illustrated in (A) of FIG. 7, the wearer of the electronic timepiece 11 can again recognize the current clock time (however, the current clock time that is not corrected).

Even before, for example, three minutes have elapsed since the state of the electronic timepiece 11 transitioned to the state C2 (refer to (B) of FIG. 7), when the wearer of the electronic timepiece 11 pushes down on the operation unit 11C, for second or more seconds, and then causes the operation unit 11C to return to its original position, the clock time synchronization is canceled. Accordingly, the state of the electronic timepiece 11 transitions from the state C2 (refer to (B) of FIG. 7) to the first state A (refer to (A) of FIG. 7). As a result, with the display on the electronic timepiece 11, which is illustrated in (A) of FIG. 7, the wearer of the electronic timepiece 11 can again recognize the current clock time (however, the current clock time that is not corrected).

Figure 9:
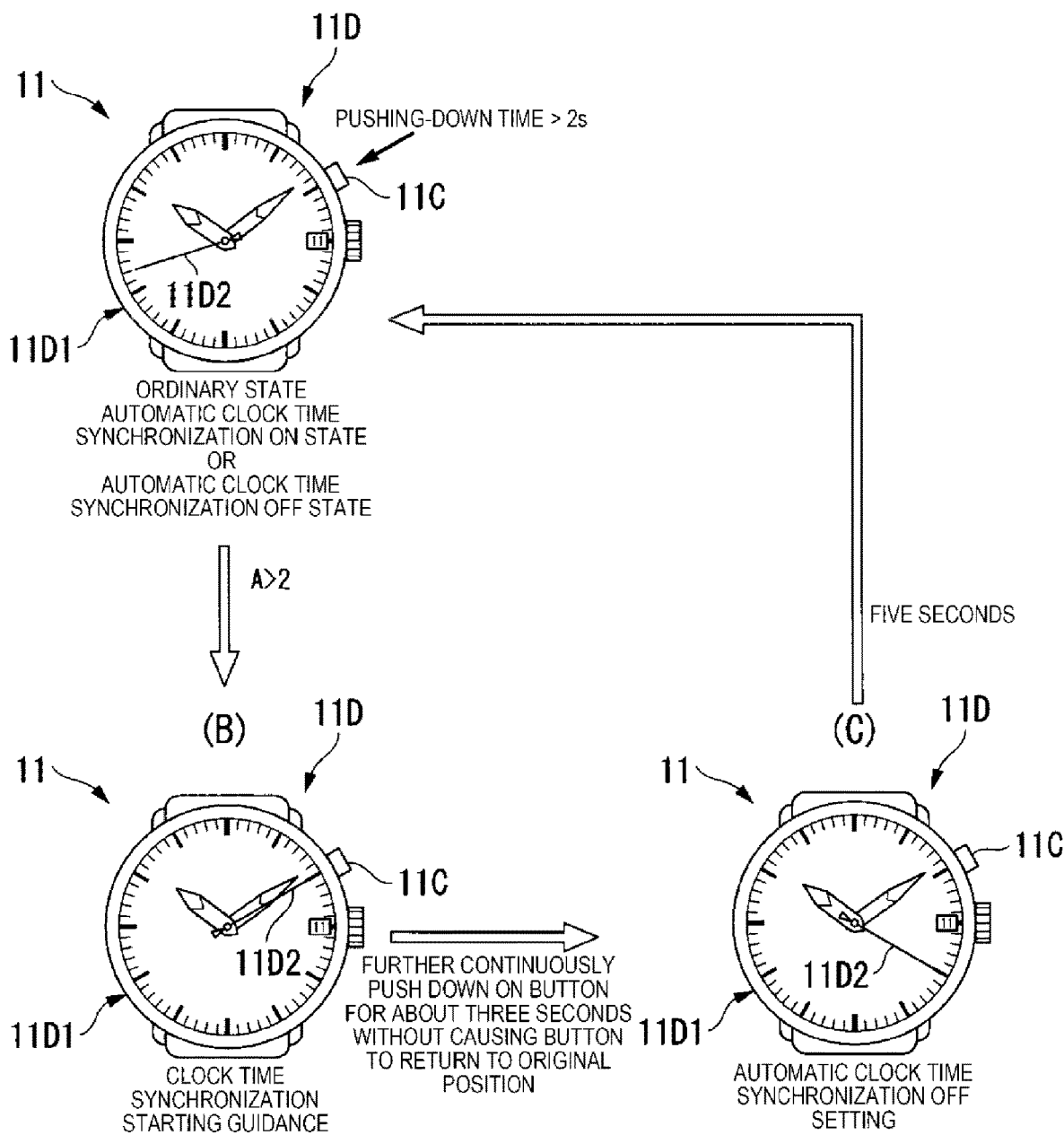
FIG. 9 is a diagram for describing an example of a third case where the state of the electronic timepiece transitions from the first state A to the third state C.

FIG. 9 is a diagram for describing an example in a third case where the state of the electronic timepiece 11 transitions from the first state A to the third state C.

As illustrated in FIGS. 1B and 9, when the wearer of the electronic timepiece 11 pushes down on the operation unit 11C of the electronic timepiece 11 in the ordinary state (the first state A) (which, in detail, is the automatic clock time synchronization ON state A1 or is the automatic clock time synchronization OFF state A2) and the period of time for which the wearer of the electronic timepiece 11 pushes down on the operation unit 11C is longer than two seconds, the state of the electronic timepiece 11 transitions from the first state A (refer to (A) of FIG. 9) to the state C1 (refer to (B) of FIG. 9) of the third state C In detail, the second hand of the electronic timepiece 11 moves from the position (the first state A) indicating the current clock time to the position (the state C1) indicating "two o'clock".

Subsequently, the operation unit 11C continues to be pushed down (more precisely, the operation unit 11C is further pushed down for a long duration) and the state of the electronic timepiece 11 transitions to the state C1 (refer to (B) of FIG. 9). When, for example, a period of time that is longer than three seconds elapsed thereafter and then the operation unit 11C is caused to return to its original position, the state of the electronic timepiece 11 transitions from the state C1 (refer to (B) of FIG. 9) of the third state C to the state C4 (refer to (C) of FIG. 9). In detail, the second hand of the electronic timepiece 11 moves from the position (the state C1) indicating "two o'clock" to the position (the state C4) indicating "four o'clock".

As described above, in the state C4, the automatic clock time synchronization setting of the electronic timepiece 11 is configured to be OFF. More precisely, the control unit 11B of the electronic timepiece 11 interrupts a state in which the periodic automatic communication is performed between the electronic timepiece 11 and the communication apparatus 12.

Furthermore, in the communication system 1 according to the first embodiment, even in a state (the automatic clock time synchronization ON state A1 (refer to (A) of FIG. 5) in which the communication unit 11A of the electronic timepiece 11 automatically and periodically makes a request to the communication apparatus 12 to establish the communication connection without an operation being performed by the user of the communication system 1, as is indicated by the arrow in (A) of FIG. 5, when the operation unit 11C of the electronic timepiece 11 is pushed down for a long duration, the electronic timepiece 11 enters the clock time synchronization starting guidance state (refer to (B) of FIG. 5) in which the approval of the communication connection to the communication apparatus 12 is demanded.

The communication unit 12A of the communication apparatus 12 goes through the state that is illustrated in (C) and (D) of FIG. 5 and transmits the clock time data to the electronic timepiece 11. In detail, the communication unit 11A of the electronic timepiece 11 enters a state in which a request is automatically and periodically made to the communication apparatus 12 to establish the communication connection, with a starting point being set to be the point in time that is included in the period of time from the point in time at which the clock time synchronization starting guidance state is entered, through the point in time at which the forced communication is started and the point in time at which the communication connection is established, to the point in time at which the clock time data is received after the communication connection is established.

More precisely, when the forced clock time synchronization is performed in the automatic clock time synchronization ON state (refer to (A) of FIG. 5), the electronic timepiece 11, for example, is made to make the connection request automatically every 24 hours.

Figure 10:
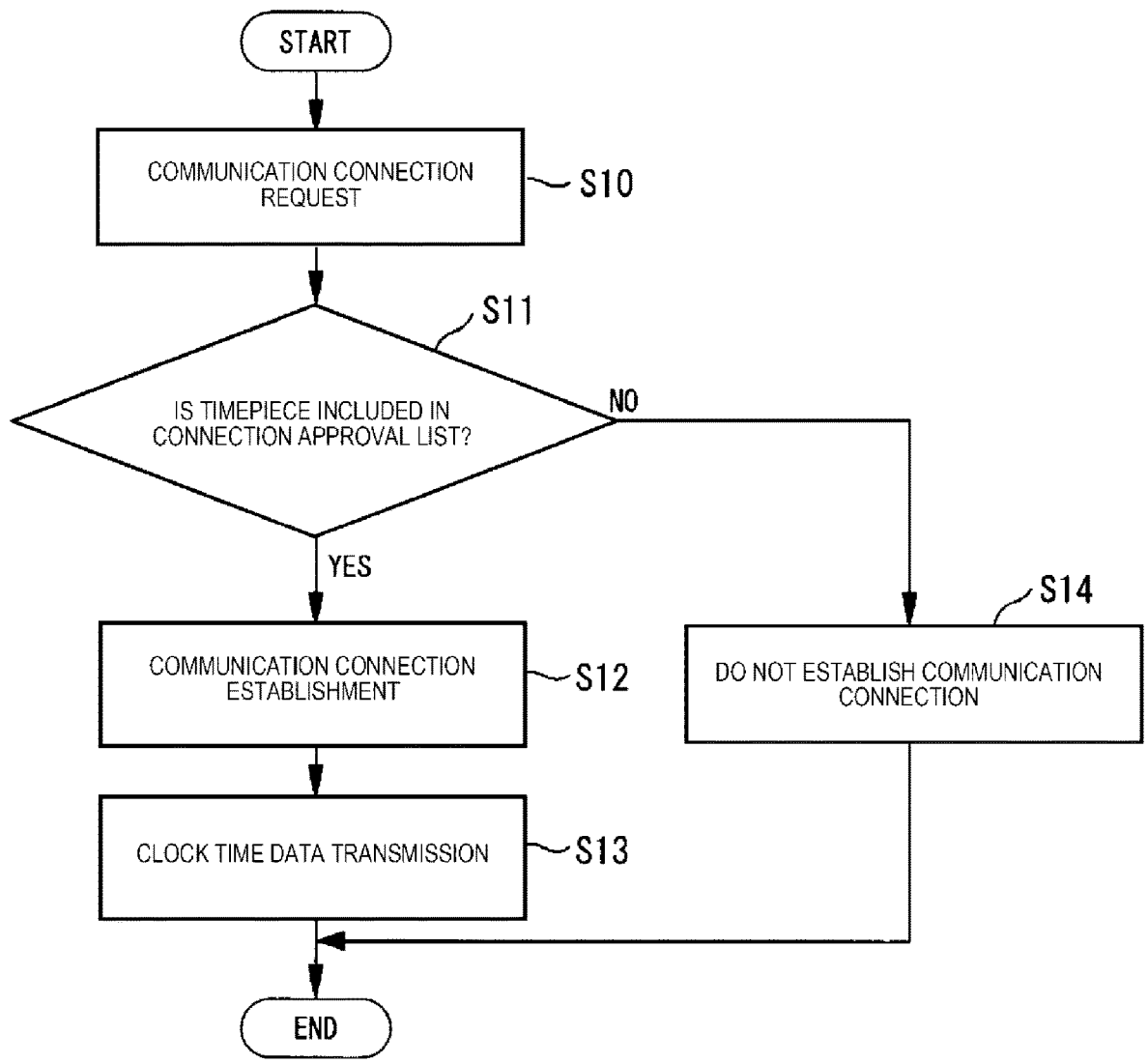
FIG. 10 is a flowchart for describing an example of principal processing that is performed in the communication system according to the first embodiment.

FIG. 10 is a flowchart for describing an example of principal processing that is performed in the communication system 1 according to the first embodiment.

In an example that is illustrated in FIG. 10, in Step S10, the communication unit 11A of the electronic timepiece 11, for example, as illustrated in FIG. 6, makes a request for the communication connection to the communication apparatus 12.

Subsequently, in Step S11, the control unit 12C of the communication apparatus 12, for example, as illustrated in FIG. 6, inquires whether or not the electronic timepiece 11 is included in the connection approval list that is stored in the storage unit 12B of the communication apparatus 12. In the case where the electronic timepiece 11 is included in the connection approval list, proceeding to Step S12 takes place. On the other hand, in a case where the electronic timepiece 11 is not included in the connection approval list, proceeding to Step S14 takes place.

In Step S12, for example, as is indicated by the bidirectional arrow between (A) and (B) of FIG. 6, the communication unit 12A of the communication apparatus 12 establishes the communication connection to the electronic timepiece 11.

Subsequently, in Step S13, for example, as is indicated by the left-pointing arrow between (A) and (B) of FIG. 6, the communication unit 12A of the communication apparatus 12 transmits the clock time data to the electronic timepiece 11.

In an example that is illustrated in FIG. 10, in Step S13, communication unit 12A of the communication apparatus 12 transmits the clock time data for the clock time correction to the electronic timepiece 11, but in another example, in Step S13, the communication unit 12A of the communication apparatus 12 may transmit clock time data for time difference correction to the electronic timepiece 11.

Moreover, in another example, in Step S13, the communication unit 12A of the communication apparatus 12 may transmit clock time data for clock time setting, for example, to the electronic timepiece 11 that went through battery replacement.

Moreover, in another example, in Step S13, the communication unit 12A of the communication apparatus 12 may transmit data for setting a tone of alarm that is generated by the electronic timepiece 11, to the electronic timepiece 11.

Moreover, in another example, in Step S13, the communication unit 12A of the communication apparatus 12 may transmit data for setting the presence or absence of sound that is output from the electronic timepiece 11, to the electronic timepiece 11.

Moreover, in another example, in Step S13, the communication unit 11A of the electronic timepiece 11 may transmit, for example, measurement data that results from performing a stoptimepiece function of the electronic timepiece 11, for example, measurement data that results from performing altimetry function of the electronic timepiece 11, for example, measurement data that results from performing MANPOKEI (a registered trademark) (a pedometer) that is included in the electronic timepiece 11, and the like, to the communication apparatus 12.

In the example that is illustrated in FIG. 10, in Step S14, the communication unit 12A of the communication apparatus 12 may not establish the communication connection to the electronic timepiece 11.

Summary of the First Embodiment

As described above, in the communication system 1 according to the first embodiment, when the communication unit 11A of the electronic timepiece 11 demands the communication connection to the communication apparatus 12, the control unit 12C of the communication apparatus 12 inquires whether or not the electronic timepiece 11 is included in the connection approval list that is stored in the storage unit 12B of the communication apparatus 12. In the case where the electronic timepiece 11 is included in the connection approval list, the communication unit 12A of the communication apparatus 12 establishes the communication connection to the electronic timepiece 11, and performs the data communication through which at least the clock time data is sent to the electronic timepiece 11. In the case where the electronic timepiece 11 is not included in the connection approval list, the communication unit 12A of the communication apparatus 12 does not establish the communication connection to the electronic timepiece 11.

For this reason, with the communication system 1 according to the first embodiment, a communication connection can be simply made between the electronic timepiece 11 and the communication apparatus 12, without the need for pairing.

Furthermore, in the communication system 1 according to the first embodiment, the communication apparatus 12 retains the connection approval list addition state in which an addition is made to the connection approval list. The communication apparatus 12 includes the operation unit 12D on which the user of the communication system 1 performs an operation. In a case where the communication apparatus 12 is in the connection approval list addition state, the control unit 12C of the communication apparatus 12 makes a search of electronic timepieces that include any other electronic timepiece which is not included in the connection approval list, and the user performs the selection operation of determining whether or not to add the electronic timepiece discovered as a result of the search to the connection approval list, on the operation unit 12D of the communication apparatus 12. In a case where the communication apparatus 12 is not in the connection approval list addition state, the control unit 12C of the communication apparatus 12 does not make a search of any other electronic timepiece, and the user does not perform the selection operation on the operation unit 12D of the communication apparatus 12.

For this reason, with the communication system 1 according to the first embodiment, according to determination by the user of the communication system 1, any other electronic timepiece can be added to the connection approval list.

Furthermore, in the communication system 1 according to the first embodiment, the electronic timepiece 11 includes the operation unit 11C in the form of a button on which the user of the communication system 1 performs an operation. The operation unit 11C is pushed down for a long duration, and thus the electronic timepiece 11 enters the clock time synchronization starting guidance state in which the approval of the communication connection to the communication apparatus 12 is demanded. In a case where the electronic timepiece 11 is in the clock time synchronization starting guidance state, when the operation unit 11C is caused to return to its original position, the communication unit 11A of the electronic timepiece 11 starts to perform forced communication with the communication apparatus 12, transmits the advertising signal (the connection request signal) to the communication apparatus 12, and makes a request to establish the communication connection to the communication apparatus 12. When the communication connection is established between the electronic timepiece 11 and the communication apparatus 12, the state is entered in which the periodic automatic communication is performed between the electronic timepiece 11 and the communication apparatus 12.

For this reason, with the communication system 1 according to the first embodiment, both the forced communication and the periodic automatic communication can be performed between the electronic timepiece 11 and the communication apparatus 12.

Furthermore, in the communication system 1 according to the first embodiment, when the wearer of the electronic timepiece 11 further pushes down on the operation unit 11C of the electronic timepiece 11 for a long duration in a state (the clock time synchronization starting guidance state) that is illustrated in (B) of FIG. 9, the control unit 11B of the electronic timepiece 11 interrupts the state in which the periodic automatic communication is performed between the electronic timepiece 11 and the communication apparatus 12.

For this reason, with the communication system 1 according to the first embodiment, the request can be met that is made by the user of the communication system 1 to interrupt the state in which the periodic automatic communication is performed between the electronic timepiece 11 and the communication apparatus 12.

Furthermore, in the communication system 1 according to the first embodiment, in a case where the electronic timepiece 11 is in a state in which the periodic automatic communication is performed (a state that is illustrated in (B) of FIG. 7), the communication unit 11A of the electronic timepiece 11 automatically and periodically makes a request to the communication apparatus 12 to establish the communication connection, without an operation being performed by the user of the communication system 1. When the request to establish the communication connection, which is made by the communication unit 11A of the electronic timepiece 11, is detected, the communication apparatus 12 inquires whether or not the electronic timepiece 11 is included in the connection approval list. In the case where the electronic timepiece 11 is included in the connection approval list, the communication unit 12A of the communication apparatus 12 approves the communication connection to the electronic timepiece 11, automatically makes the communication connection to the electronic timepiece 11, and transmits at least the clock time data to the electronic timepiece 11. In the case where the electronic timepiece 11 is not included in the connection approval list, the communication unit 12A of the communication apparatus 12 does not establish the communication connection to the electronic timepiece 11.

For this reason, with the communication system 1 according to the first embodiment, at least the clock time data can be transmitted automatically and periodically from the communication apparatus 12 to the electronic timepiece 11 without an operation being performed by the user of the communication system 1.

Furthermore, in the communication system 1 according to the first embodiment, the control unit 11B of the electronic timepiece 11 determines the operation of the electronic timepiece 11 based on whether or not a specific command that is included in the clock time data is transmitted from the communication apparatus 12.

For this reason, with the communication system 1 according to the first embodiment, a concern (for example, a concern that a correction of a clock time will be erroneously made) that the electronic timepiece 11 will malfunction if the electronic timepiece 11 makes a connection to a wrong apparatus (an apparatus other than the communication apparatus 12) can be suppressed.

Furthermore, in the communication system 1 according to the first embodiment, the operation unit 12D of the communication apparatus 12 retains the function of batch-erasing the connection approval list (the function of erasing the information on the electronic timepiece that is registered in the connection approval list). It is noted that individual erasing may be performed.

For this reason, with the communication system 1 according to the first embodiment, compared to a case where the operation unit 12D of the communication apparatus 12 does not retain the function of batch-erasing the connection approval list, the operability of the communication system 1 can be improved.

Furthermore, in the communication system 1 according to the first embodiment, although the communication unit 11A of the electronic timepiece 11 is in the state in which a request is automatically and periodically made to the communication apparatus 12 to establish the communication connection without an operation being performed by the user of the communication system 1, the electronic timepiece 11 enters the clock time synchronization starting guidance state by the operation unit 11C of the electronic timepiece 11 being pushed down for a long duration. When this is done, the communication unit 11A of the electronic timepiece 11 enters the state in which a request is automatically and periodically made to the communication apparatus 12 to establish the communication connection, with the starting point being set to be the point in time that is included in the period of time from the point in time at which the clock time synchronization starting guidance state is entered, through the point in time at which the forced communication is started and the point in time at which the communication connection is established, to the point in time at which the clock time data is received after the communication connection is established.

For this reason, with the communication system 1 according to the first embodiment, in the state in which a request is automatically and periodically made to the communication apparatus 12 to establish the communication connection without an operation being performed by the user of the communication system 1, communication between the electronic timepiece 11 and the communication apparatus 12, which meets the request that is made by the user of the communication system 1, can be performed.

In detail, in the communication system 1 according to the first embodiment, the electronic timepiece 11 includes the hand 11D2, as the display unit 11D, a push-button switch that functions as the operation unit 11C, a winding knob, a winding-knob rotation switch, and the like.

When pushing down on the push-button switch as the operation unit 11C and then causing the push-button switch to return to its original position within less than a prescribed period of time (for example, two seconds), with the second hand, the user of the communication system 1 can know a current automatic clock time synchronization setting state (the automatic clock time synchronization OFF state or the automatic clock time synchronization ON state).

When the user of the communication system 1 continues to push down on the push-button switch as the operation unit 11C for the prescribed period of time (for example, two seconds) or longer, as illustrated in (B) of FIG. 5, the second hand points to "10 seconds (two o'clock)" in the clockwise direction, and indicates the clock time synchronization starting guidance state.

In a state that is illustrated in (B) of FIG. 5, when the user of the communication system 1 causes the push-button switch as the operation unit 11C to return to its original position within three seconds, the electronic timepiece 11 enters the clock time synchronization starting guidance state (a state that is illustrated in (B) of FIG. 5), and the communication unit 11A of the electronic timepiece 11 transmits a connection request that a non-periodic forced communication connection to the communication apparatus 12 is demanded, as is indicated by the right-pointing arrow between (A) and (B) of FIG. 6. In detail, for example, with short-distance wireless communication such as Bluetooth (a registered trademark), the communication unit 11A of the electronic timepiece 11 transmits an advertisement in all directions.

When, in the state that is illustrated in (B) of FIG. 9, for example, for three seconds, the user of the communication system 1 further pushes down on the push-button switch as the operation unit 11C and then causes the push-button switch to return to its original position, the hand 11D2 (in detail, the second hand), as illustrated in (C) of FIG. 9, points to "four o'clock (20 seconds)". As a result, the electronic timepiece 11 switches to the automatic clock time synchronization OFF state, and periodic communication with the communication apparatus 12 enters an OFF state.

Furthermore, in the communication system 1 according to the first embodiment, as illustrated in (B) of FIG. 6, for example, the communication apparatus 12 such as a smartphone executes an application and enters a state (the connection approval list addition state in which an addition is made to the connection approval list), in which a new electronic timepiece 11 is added to the connection approval list.

In the connection approval list addition state, in a case where a service UUID that is expected by advertisement data that is transmitted by the electronic timepiece 11 or an apparatus name that is expected is found, as illustrated in (C) of FIG. 6, the communication apparatus 12 displays a dialog that urges the user of the communication system 1 to determine whether or not the detected electronic timepiece 11 is added to the connection approval list.

In a state that is illustrated in (C) of FIG. 6, in the case where the user of the communication system 1 selects YES (in a case where a selection is made for adding the detected electronic timepiece 11 to the connection approval list), the communication apparatus 12 adds the detected electronic timepiece 11 to the connection approval list. In detail, the communication apparatus 12 adds Bluetooth address of the detected electronic timepiece 11, or a UUID or the like that is allocated by an OS of the communication apparatus 12 to the electronic timepiece 11, to the connection approval list. Thereafter, the communication apparatus 12 establishes the communication connection to the electronic timepiece 11, and performs the data communication such as the clock time data.

In the state that is illustrated in (C) of FIG. 6, in a case where the user of the communication system 1 does not perform an operation of adding the electronic timepiece 11 to the connection approval list (in a case where NO is selected), the communication apparatus 12 neither adds the detected electronic timepiece 11 to the connection approval list, nor establishes the communication connection to the electronic timepiece 11.

More precisely, only in a case where a service UUID or an apparatus name that is expected or both are advertised and where the electronic timepiece 11 that is added to the connection approval list makes a request for a communication connection, as illustrated in (A) and (B) of FIG. 8, the communication apparatus 12 automatically establishes the communication connection to the electronic timepiece 11, and automatically performs the data communication such as the clock time data.

Second Embodiment

A communication system, a communication method, an electronic timepiece, and a communication apparatus according to a second embodiment of the invention will be described below.

A communication system 1 according to the second embodiment has the same configuration as the communication system 1 according to the first embodiment, which is described above, except for a configuration that will be described below. Therefore, the communication system 1 according to the second embodiment can achieve the same effect as communication system 1 according to the first embodiment, which is described above, except for an effect that will be described below.

The communication system 1 according to the second embodiment has the same configuration as the communication system 1 according to the first embodiment, which is illustrated in FIG. 1.

In the communication system 1 according to the first embodiment, the communication unit 11A of the electronic timepiece 11 transmits the same advertisement signal in a case where, as illustrated in (B) and (C) of FIG. 5, in the clock time synchronization starting guidance state, a request is made to the communication apparatus 12 to establish the communication connection, and in a case where, as illustrated in (A) and (B) of FIG. 7, a request is automatically and periodically made to the communication apparatus 12 to establish the communication connection without the operation being performed by the user of the communication system 1.

On the other hand, in the communication system 1 according to the second embodiment, the communication unit 11A of the electronic timepiece 11 transmits a different advertisement signal in the case where, as illustrated in (B) and (C) of FIG. 5, in the clock time synchronization starting guidance state, a request is made to the communication apparatus 12 to establish the communication connection, and in the case where, as illustrated in (A) and (B) of FIG. 7, a request is automatically and periodically made to the communication apparatus 12 to establish the communication connection without the operation being performed by the user of the communication system 1.

Furthermore, in the communication system 1 according to the second embodiment, among other electronic timepieces 11 that are not included in the connection approval list, the communication apparatus 12 does not add to the connection approval list any other electronic timepiece 11 that automatically and periodically makes a request to establish the communication connection, as illustrated in (A) and (B) of FIG. 7, and adds to the connection approval list any other electronic timepiece 11 that makes a request to establish the communication connection in the clock time synchronization starting guidance state (a state in which forced communication starts), as illustrated in (B) and (C) of FIG. 5.

More precisely, in the communication system 1 according to the second embodiment, there is a difference in the advertisement data between a case where the user of the communication system 1 pushes down on the push-button switch as the operation unit 11C as illustrated in (A) of FIG. 5 and the electronic timepiece 11 issues a request to establish the communicational connection as is indicated by the right-pointing arrow between (A) and (B) of FIG. 6, and a case where the electronic timepiece 11 automatically issues a request to establish the communication connection, at a prescribed timing, as is indicated by the right-pointing arrow between (A) and (B) of FIG. 8. Only in a case where the electronic timepiece 11 transmits the advertisement data, the communication apparatus 12 adds the electronic timepiece 11 to the connection approval list as is indicated by the right-pointing arrow between (A) and (B) of FIG. 6, based on the operation in which the user of the communication system 1 pushes down on the push-button switch as the operation unit 11C as illustrated in (A) of FIG. 5.

Third Embodiment

A communication system, a communication method, an electronic timepiece, and a communication apparatus according to a third embodiment of the invention will be described below.

A communication system 1 according to the third embodiment has the same configuration as the communication system 1 according to the first embodiment, which is described above, except for a configuration that will be described below. Therefore, the communication system 1 according to the third embodiment can achieve the same effect as communication system 1 according to the first embodiment, which is described above, except for an effect that will be described below.

The communication system 1 according to the third embodiment has the same configuration as the communication system 1 according to the first embodiment, which is illustrated in FIG. 1.

In the communication system 1 according to the first embodiment, even in a case where the electronic timepiece 11 is present that does not establish the communication connection to the communication apparatus 12 for a fixed period or longer, the control unit 12C of the communication apparatus 12 does not automatically remove the electronic timepiece 11 from the connection approval list without the operation being performed by the user of the communication system 1.

On the other hand, in the communication system 1 according to the third embodiment, the control unit 12C of the communication apparatus 12 automatically removes the electronic timepiece 11 that does not establish the communication connection to the communication apparatus 12 for a fixed period of time or longer, from the connection approval list, without the operation being performed by the user of the communication system 1.

In detail, in the communication system 1 according to the third embodiment, the communication apparatus 12 measures the time that has elapsed since the last time the communication connection to the electronic timepiece 11 was made. In a case where the communication connection between the communication apparatus 12 and the electronic timepiece 11 is not for a fixed period of time or longer, the communication apparatus 12 automatically deletes the electronic timepiece 11 from the connection approval list.

Fourth Embodiment

A communication system, a communication method, an electronic timepiece, and a communication apparatus according to a fourth embodiment of the invention will be described below.

A communication system 1 according to the fourth embodiment has the same configuration as the communication system 1 according to the first embodiment, which is described above, except for a configuration that will be described below. Therefore, the communication system 1 according to the fourth embodiment can achieve the same effect as communication system 1 according to the first embodiment, which is described above, except for an effect that will be described below.

The communication system 1 according to the fourth embodiment has the same configuration as the communication system 1 according to the first embodiment, which is illustrated in FIG. 1.

In the communication system 1 according to the first embodiment, even in a case where the reception signal strength of the electronic timepiece 11 that demands the communication connection from the communication apparatus 12 is at less than the fixed value, the user of the communication system 1 can perform the selection operation of determining whether or not to add the electronic timepiece 11 to the connection approval list, on the operation unit 12D of the communication apparatus 12.

On the other hand, in the communication system 1 according to the fourth embodiment, the reception signal strength detection unit 12E detects the reception signal strength of the electronic timepiece 11 that demands the communication connection from the communication apparatus 12. In a case where the reception signal strength of the electronic timepiece 11 that demands the communication connection from the communication apparatus 12 is at or above the fixed value, the user of the communication system 1 performs the selection operation of determining whether or not to add the electronic timepiece 11 to the connection approval list, on the operation unit 12D of the communication apparatus 12.

In the communication system 1 according to the fourth embodiment, in a case where the reception signal strength of the electronic timepiece 11 that demands the communication connection from the communication apparatus 12 is at less than the fixed value, the user of the communication system 1 does not perform the selection operation of determining whether or not to add the electronic timepiece 11 to the connection approval list, on the operation unit 12D of the communication apparatus 12.

More precisely, in the communication system 1 according to the fourth embodiment, the communication apparatus 12 measures a distance between the communication apparatus 12 and the electronic timepiece 11 based on the reception signal strength. Only in a case where it is considered that a distance to the electronic timepiece 11 is at or above fixed value and the electronic timepiece 11 is nearby, the communication apparatus 12 adds the electronic timepiece 11 to the connection approval list.

With the communication systems 1 according to the first to fourth embodiments, a connection can be simply made between the electronic timepiece 11 and the communication apparatus 12 without the need for pairing. Moreover, regardless of a state of approval or prohibition of a current communication connection, with the same operation (operation of one button) the user of the communication system 1 can select among starting of the forced communication, starting of the periodic communication, and ending of the periodic communication. For this reason, with the communication systems 1 according to the first to fourth embodiments, the communication system 1 that is easy to use can be realized without causing an erroneous operation.

It is noted that a program for realizing one or several functions or all functions of the communication system 1 may be recorded on a computer-readable recording medium, and thus that the program recorded on the computer-readable medium may be read by a computer system and then be executed so that processing by each unit is performed. It is noted that the "computer system" here is defined as including an OS and hardware components such as a peripheral device. Furthermore, if a WWW system is used, the "computer system" is defined as also creating an environment (or a display environment) in which a web page is provided.

Furthermore, the "computer-readable recording medium" refers to a storage device, such as a portable medium, such as a flexible disk, a magneto-optical disk, a ROM, and a CD-ROM, and a hard disk, that is built into the computer system. Moreover, the "computer-readable recording medium" is defined as including whatever dynamically includes the program for a short period of time, such as a communication line that is used when transmitting the program over a network such as the Internet or over a communication circuit such as a telephone circuit and as including whatever retains the program for a given period of time, such as a volatile memory within the computer system, which functions as a server or a client in the case of including the program dynamically. Furthermore, the program described above may be one for realizing some of the functions described above and additionally may be one that can realize the functions described above in combination with a program that is already recorded on the computer system.

The communication system, the communication method, the electronic timepiece, and the communication apparatus according to the embodiments of the invention have been described above, but specific configurations are not limited to the embodiments. A change to a design and the like that does not depart from the gist of the invention falls within the scope of the invention.

What is claimed is:

1. A communication system comprising:
an electronic timepiece; and
a communication apparatus,
wherein the electronic timepiece includes
an electronic-timepiece communication unit that performs communication with the communication apparatus, and
an electronic-timepiece control unit that controls the electronic-timepiece communication unit,
wherein the communication apparatus includes
a communication-apparatus communication unit that performs communication with the electronic timepiece,
a communication-apparatus operation unit operated by a user of the communication system to performs an input,
a communication-apparatus storage unit in which a connection approval list is stored, and
a communication-apparatus control unit that controls the communication-apparatus communication unit,
wherein, when the electronic-timepiece communication unit of the electronic timepiece demands a communication connection to the communication apparatus, the communication-apparatus control unit inquires whether or not the connection approval list stored in the communication-apparatus storage includes the electronic timepiece demanding the communication connection,
wherein, when the electronic timepiece demanding the communication connection is included in the connection approval list, the communication-apparatus communication unit establishes the communication connection to the electronic timepiece demanding the communication connection and performs data communication through which at least clock time data is sent to the electronic timepiece for which the communication connection has been established,
wherein, when the electronic timepiece demanding the communication connection is not included in the connection approval list, the communication-apparatus communication unit does not establish the communication connection to the electronic timepiece demanding the communication connection,
wherein, while the communication apparatus is in a connection approval list addition state in which any other electronic timepieces are to be added in the connection approval list, the communication-apparatus control unit searches for the electronic timepiece not included in the connection approval list and prompts a user to accept or deny addition to the connection approval list of the electronic timepiece as a result of the search,
wherein in response to the user's acceptance, through the communication-apparatus operation unit, of the electronic timepiece discovered as a result of the search, the communication-apparatus control unit adds the electronic timepiece discovered as a result of the search in the connection approval list,
wherein in response to the user's denial, through the communication-apparatus operation unit, of the electronic timepiece discovered as a result of the search, the communication-apparatus control unit does not add the electronic timepiece discovered as a result of the search in the connection approval list, and
wherein, while the communication apparatus is not in the connection approval list addition state, the communication-apparatus control unit does not search for the electronic timepiece not included in the connection approval list.

2. The communication system according to claim 1,
wherein the electronic timepiece includes an electronic-timepiece operation unit in the form of a button on which the user of the communication system performs an operation,
wherein the electronic timepiece enters a clock time synchronization starting guidance state in which an approval of the communication connection to the communication apparatus is demanded, by the electronic-timepiece operation unit being pushed down for a long duration,
wherein, when the electronic timepiece is in the clock time synchronization starting guidance state, when the electronic-timepiece operation unit is caused to return to its original position, the electronic-timepiece communication unit starts to perform forced communication with the communication apparatus, transmits a connection request signal to the communication apparatus, and makes a request to establish the communication connection to the communication apparatus, and wherein, when the communication connection is established between the electronic timepiece and the communication apparatus, the electronic-timepiece communication unit enters a state in which periodic automatic communication is performed between the electronic timepiece and the communication apparatus.

3. The communication system according to claim 2, wherein, when the electronic timepiece is in the clock time synchronization starting guidance state, when the electronic-timepiece operation unit is further pushed down for the long duration, the electronic-timepiece control unit interrupts the state in which the periodic automatic communication is performed.

4. The communication system according to claim 2, wherein, when the electronic timepiece is in the state in which the periodic automatic communication is performed, the electronic-timepiece communication unit automatically and periodically makes a request to the communication apparatus to establish the communication connection without an operation being performed by the user of the communication system,
wherein, when detecting the request to establish the communication connection, which is made by the electronic-timepiece communication unit, the communication apparatus inquires whether or not the electronic timepiece is included in the connection approval list,
wherein, when the electronic timepiece is included in the connection approval list, the communication-apparatus communication unit approves the communication connection to the electronic timepiece, automatically makes the communication connection to the electronic timepiece, and transmits at least clock time data to the electronic timepiece, and
wherein, when the electronic timepiece is not included in the connection approval list, the communication-apparatus communication unit does not establish the communication connection to the electronic timepiece.

5. The communication system according to claim 4, wherein, although the electronic-timepiece communication unit is in a state in which a request is automatically and periodically made to the communication apparatus to establish the communication connection without the operation being performed by the user of the communication system, when the electronic-timepiece operation unit is pushed down for the long duration and thus the electronic timepiece enters the clock time synchronization starting guidance state, the electronic-timepiece communication unit is in the state in which the request is automatically and periodically made to the communication apparatus to establish the communication connection, with a starting point being set to be a point in time that is included in a period of time from a point in time at which the clock time synchronization starting guidance state is entered, through a point in time at which forced communication is started and a point in time at which the communication connection is established, to a point in time at which the clock time data is received after the communication connection is established.

6. The communication system according to claim 4, wherein the electronic-timepiece communication unit transmits a different connection request signal when a request is made to the communication apparatus to establish the communication connection in the clock time synchronization starting guidance state, and when a request is automatically and periodically made to the communication apparatus to establish the communication connection without the operation being performed by the user of the communication system, and
wherein, among other electronic timepieces that are not included in the connection approval list, the communication apparatus does not add to the connection approval list any other electronic timepiece that automatically and periodically makes a request to establish the communication connection and adds to the connection approval list any other electronic timepiece that makes a request to establish the communication connection in a state where the forced communication starts.

7. The communication system according to claim 1, wherein the electronic-timepiece control unit determines operation of the electronic timepiece based on whether or not a specific command that is included in the clock time data is transmitted from the communication apparatus.

8. The communication system according to claim 1, wherein the communication-apparatus operation unit has a function of erasing information on the electronic timepiece that is registered in the connection approval list.

9. The communication system according to claim 1, wherein the communication-apparatus control unit automatically erases from the connection approval list the electronic timepiece that does not establish the communication connection to the communication apparatus for a fixed period of time or longer, without an operation being performed by a user of the communication system.

10. The communication system according to claim 1, wherein the communication apparatus includes a reception signal strength detection unit that detects reception signal strength, and
wherein, when reception signal strength of the any other electronic timepiece that demands the communication connection from the communication apparatus is at or above a fixed value, the selection operation of determining whether or not to add the any other electronic timepiece to the connection approval list is performed by the user, on the communication-apparatus operation unit.

11. A method of communication between an electronic timepiece and a communication apparatus,
wherein the electronic timepiece includes
an electronic-timepiece communication unit that performs communication with the communication apparatus, and
an electronic-timepiece control unit that controls the electronic-timepiece communication unit,
wherein the communication apparatus includes
a communication-apparatus communication unit that performs communication with the electronic timepiece,
a communication-apparatus operation unit operated by a user of the communication system to performs an input,
a communication-apparatus storage unit in which a connection approval list is stored, and
a communication-apparatus control unit that controls the communication-apparatus communication unit,
the method comprising:
when the electronic-timepiece communication unit of the electronic timepiece demands a communication connection to the communication apparatus, inquiring by the communication-apparatus control unit whether or not the connection approval list stored in the communication-apparatus storage includes the electronic timepiece demanding the communication connection;
when the electronic timepiece demanding the communication connection is included in the connection approval list, establishing by the communication-apparatus communication unit a communication connection to the electronic timepiece demanding the communication connection and performing data communication through which at least clock time data is sent to the electronic timepiece for which the communication connection has been established;

when the electronic timepiece demanding the communication connection is not included in the connection approval list, not establishing by the communication-apparatus communication unit a communication connection to the electronic timepiece demanding the communication connection while the communication apparatus is in a connection approval list addition state in which any other electronic timepieces are to be added in the connection approval list, searching by the communication-apparatus control unit for the electronic timepiece not included in the connection approval list and prompting a user to accept or deny addition, to the connection approval list, of the electronic timepiece discovered as a result of the search, in response to the user's acceptance, through the communication-apparatus operation unit, of the electronic timepiece discovered as a result of the search, adding by the communication-apparatus control unit the electronic timepiece discovered as a result of the search in the connection approval list, in response to the user's denial, through the communication-apparatus operation unit, of the electronic timepiece discovered as a result of the search, not adding by the communication-apparatus control unit the electronic timepiece discovered as a result of the search in the connection approval list, and while the communication apparatus is not in the connection approval list addition state, not searching by the communication-apparatus control unit for the electronic timepiece not included in the connection approval list.

12. A communication apparatus that performs communication with an electronic timepiece, the apparatus comprising:

a communication-apparatus communication unit that performs communication with the electronic timepiece;

a communication-apparatus operation unit operated by a user of the communication system to performs an input, a communication-apparatus storage unit in which a connection approval list is stored; and a communication-apparatus control unit that controls the communication-apparatus communication unit, wherein the electronic timepiece includes an electronic-timepiece communication unit that performs communication with the communication apparatus, and an electronic-timepiece control unit that controls the electronic timepiece communication unit, wherein, when the electronic-timepiece communication unit of the electronic timepiece demands a communication connection to the communication apparatus, the communication-apparatus control unit inquires whether or not the connection approval list stored in the communication-apparatus storage includes the electronic timepiece demanding the communication connection, wherein, when the electronic timepiece demanding the communication connection is included in the connection approval list, the communication-apparatus communication unit establishes the communication connection to the electronic timepiece demanding the communication connection and performs data communication through which at least clock time data is sent to the electronic timepiece for which the communication connection has been established, wherein, when the electronic timepiece demanding the communication connection is not included in the connection approval list, the communication-apparatus communication unit does not establish the communication connection to the electronic timepiece demanding the communication connection, wherein, while the communication apparatus is in a connection approval list addition state in which any other electronic timepieces are to be added in the connection approval list, the communication-apparatus control unit searches for the electronic timepiece not included in the connection approval list and prompts a user to accept or deny addition to the connection approval list of the electronic timepiece discovered as a result of the search, wherein in response to the user's acceptance, through the communication-apparatus operation unit, of the electronic timepiece discovered as a result of the search, the communication-apparatus control unit adds the electronic timepiece discovered as a result of the search in the connection approval list, wherein in response to the user's denial, through the communication-apparatus operation unit, of the electronic timepiece discovered as a result of the search, the communication-apparatus control unit does not add the electronic timepiece discovered as a result of the search in the connection approval list, and wherein, while the communication apparatus is not in the connection approval list addition state, the communication-apparatus control unit does not search for the electronic timepiece not included in the connection approval list.

* * * * *